(12) United States Patent
Neumann

(10) Patent No.: US 11,960,193 B2
(45) Date of Patent: Apr. 16, 2024

(54) BACKDROP REAR-ILLUMINATION APPARATUS, AN ACTIVE GREEN SCREEN AND A METHOD FOR DYNAMIC BACKDROP REAR-ILLUMINATION

(71) Applicant: SUB2r Inc., San Francisco, CA (US)

(72) Inventor: Richard Neumann, San Francisco, CA (US)

(73) Assignee: SUB2r Inc., San Francisco, CA (US)

( * ) Notice: Subject to any disclaimer, the term of this patent is extended or adjusted under 35 U.S.C. 154(b) by 127 days.

(21) Appl. No.: 17/563,294

(22) Filed: Dec. 28, 2021

(65) Prior Publication Data

US 2023/0205053 A1    Jun. 29, 2023

(51) Int. Cl.
| | |
|---|---|
| G03B 15/06 | (2021.01) |
| G03B 15/10 | (2021.01) |
| G06F 3/04847 | (2022.01) |
| G06T 7/11 | (2017.01) |
| G06T 7/194 | (2017.01) |
| H04N 9/75 | (2006.01) |
| H05B 47/175 | (2020.01) |

(52) U.S. Cl.
CPC ............ *G03B 15/06* (2013.01); *G03B 15/10* (2013.01); *G06F 3/04847* (2013.01); *G06T 7/11* (2017.01); *G06T 7/194* (2017.01); *H04N 9/75* (2013.01); *H05B 47/175* (2020.01); *G06T 2207/10024* (2013.01)

(58) Field of Classification Search
CPC ................................ G03B 15/06; G03B 15/10
See application file for complete search history.

(56) References Cited

U.S. PATENT DOCUMENTS

| | | |
|---|---|---|
| 7,418,197 B2 | 8/2008 | Didow et al. |
| 7,672,530 B2 | 3/2010 | Friedhoff et al. |
| 7,873,219 B2 | 1/2011 | Friedhoff |

(Continued)

OTHER PUBLICATIONS

International Search Report and Written Opinion for International Application No. PCT/US2022/053638, dated Apr. 5, 2023, 10 pages.

*Primary Examiner* — Lixi C Simpson
(74) *Attorney, Agent, or Firm* — Buchanan Ingersoll & Rooney PC

(57) ABSTRACT

Backdrop rear-illumination apparatus, active green screen and method for performing dynamic backdrop rear-illumination. The active green screen comprises a green screen, a diffusing material and a backdrop rear-illumination apparatus, the backdrop rear-illumination apparatus comprising a light assembly and a light controller. The light assembly comprises one or more light-emitting device, a light emitted by each light-emitting device first passing through the diffusing material and then passing through the green screen. The light controller comprises light driver(s) for controlling at least one operating parameter of the light-emitting device(s). The light controller further comprises at least one user interface or a light remote control module for respectively actuating the light driver(s). A computing device generates light control command(s) via a graphical user interface or an algorithm. The light control command(s) are transmitted to the light remote control module for controlling the at least one operating parameter of the light-emitting device(s).

20 Claims, 25 Drawing Sheets

(56) References Cited

U.S. PATENT DOCUMENTS

| | | | |
|---|---|---|---|
| 7,894,713 B1 * | 2/2011 | Clark | G03B 15/00 396/3 |
| 8,787,666 B2 | 7/2014 | Friedhoff et al. | |
| 9,330,337 B2 | 5/2016 | Friedhoff et al. | |
| 9,894,257 B2 | 2/2018 | Fournier et al. | |
| 10,382,706 B2 | 8/2019 | Scharer, III et al. | |
| 2006/0114356 A1 * | 6/2006 | Didow | G03B 15/07 396/3 |
| 2008/0055880 A1 * | 3/2008 | Williams | G03B 15/02 362/311.06 |
| 2008/0166111 A1 | 7/2008 | Didow et al. | |
| 2008/0246777 A1 * | 10/2008 | Swanson | H04N 5/272 348/E5.029 |
| 2018/0262698 A1 | 9/2018 | Scharer et al. | |
| 2019/0197821 A1 | 6/2019 | Hutchinson-Kay et al. | |
| 2020/0186772 A1 | 6/2020 | Pendlebury | |
| 2021/0390953 A1 | 12/2021 | Makker et al. | |
| 2022/0095428 A1 * | 3/2022 | Edwards | H05B 45/20 |

\* cited by examiner

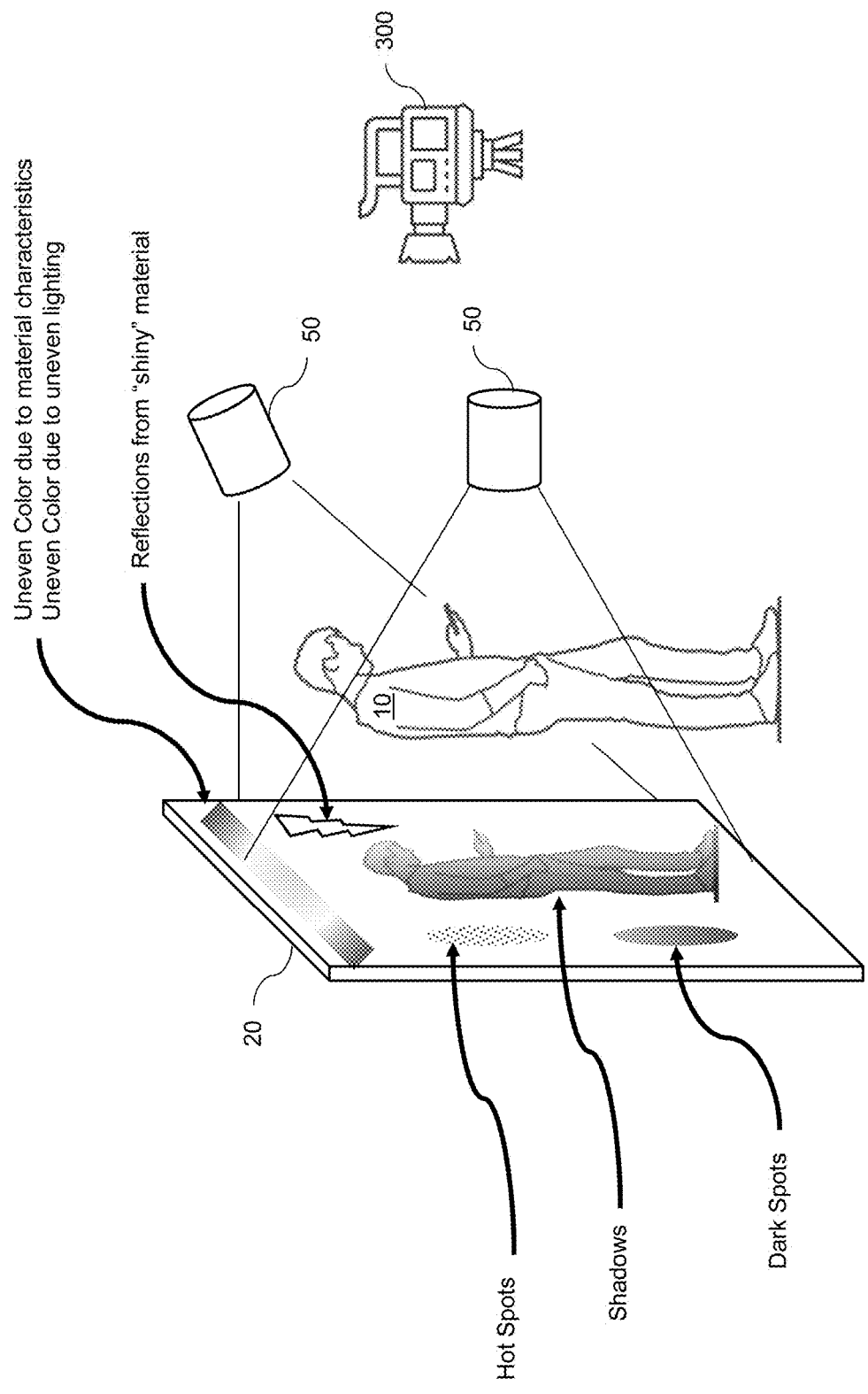

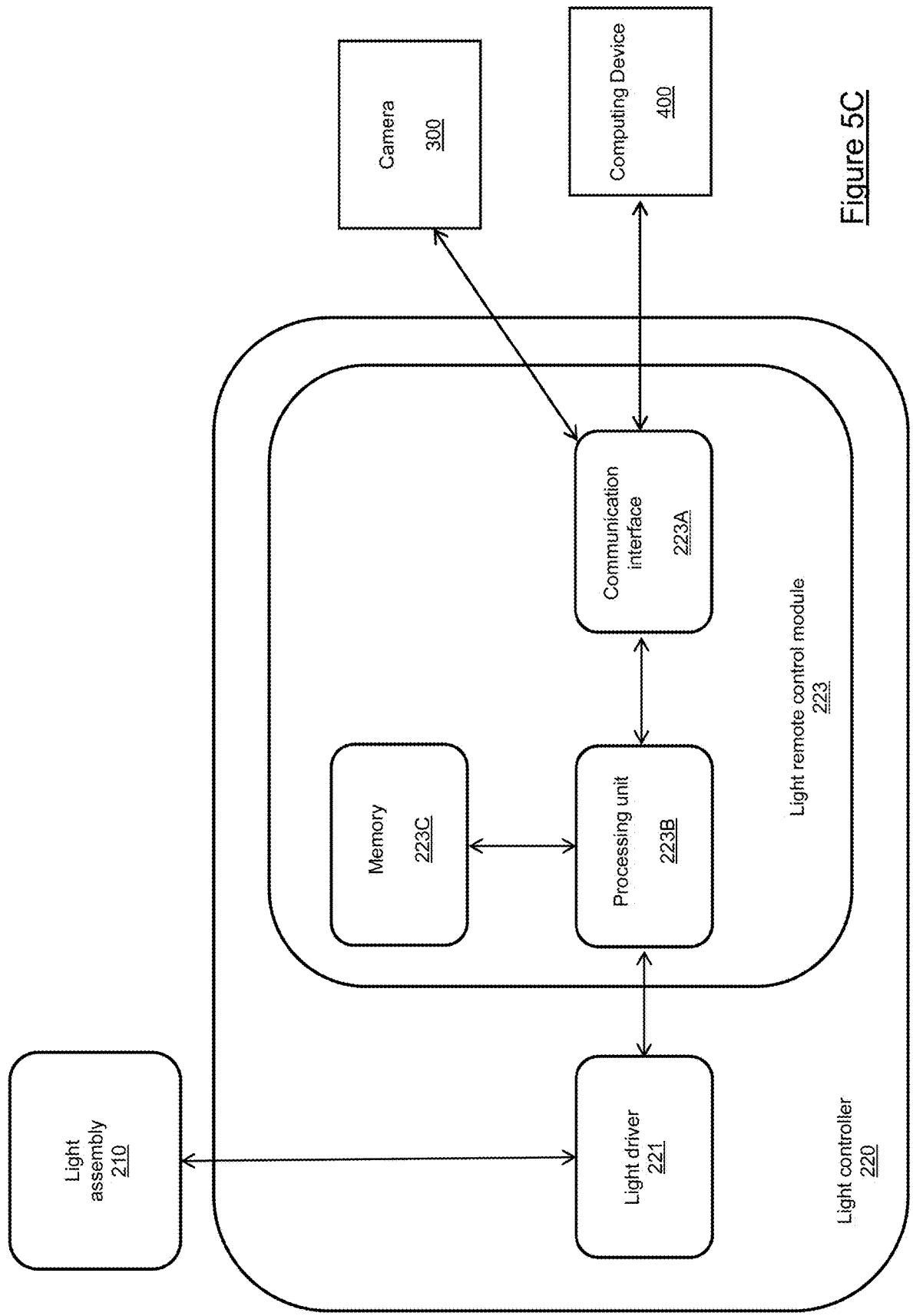

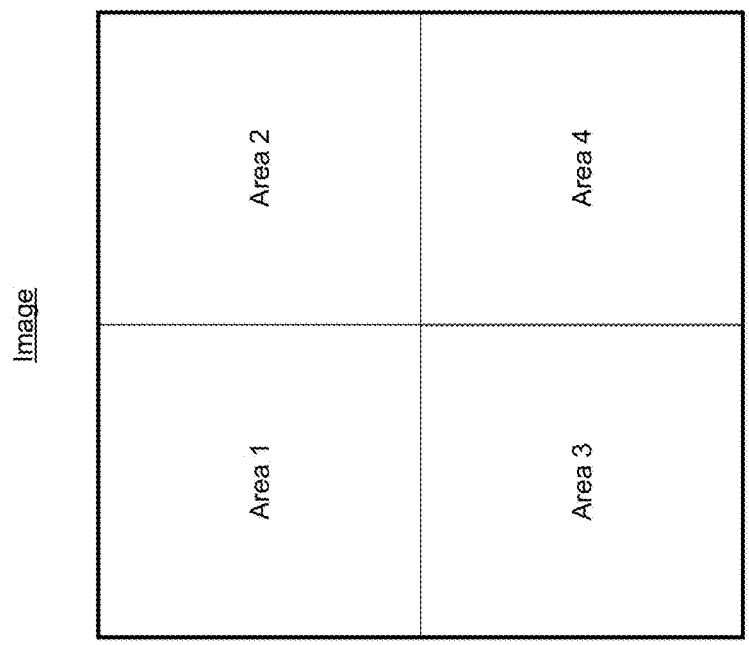
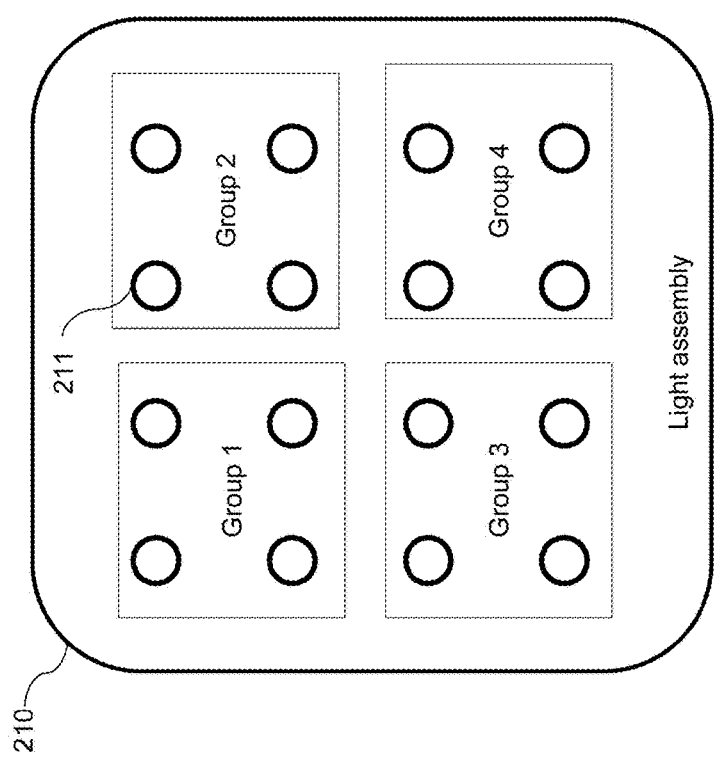
Figure 11

BACKDROP REAR-ILLUMINATION APPARATUS, AN ACTIVE GREEN SCREEN AND A METHOD FOR DYNAMIC BACKDROP REAR-ILLUMINATION

TECHNICAL FIELD

The present disclosure relates to the field of chroma key compositing. More specifically, the present disclosure presents a backdrop rear-illumination apparatus, an active green screen and a method for dynamic backdrop rear-illumination.

BACKGROUND

Chroma key compositing is a technique consisting in positioning a subject in front of a monochromatic color background, capturing an image/video of the subject, and removing or replacing the monochromatic color background captured in the image/video by a background replacement content such that it can be combined with other still or video images. The resulting combined image/video is one where the subject appears to be in an environment (e.g. a location) different from their actual environment in front of the monochromatic color background.

Various techniques are currently used for implementing the monochromatic color background. For example, a backing wall or cloth (often called a green backdrop) having a selected green color is placed in the background and lit by lights positioned in front and sides of the green backdrop to generate the monochromatic green color background. Background and three dimensional objects may be painted green to allow the subjects to position themselves in relation to images which will be added later in the process. For the purpose of distinction, this is referred to as a passive system as the purpose of the background is to reflect green, control of intensity produced by external light sources. Alternatively, a monochrome screen is used for generating the monochromatic green color background. It should be noted that chroma key compositing is not limited to a monochromatic green color background but may use any monochromatic color such as blue background instead, or any other appropriate monochromatic color background.

Well known defects of chroma key compositing include the presence of shadowed area(s), dark spots, hot spots, reflections in the generated monochromatic color background, etc. The shadowed area(s) may be caused by various factors, including shadow cast by the subject, proximity of the subject to the background, shadow cast by external light sources, shadow cast by the environment where the image/video capture is performed, etc. Dark spots may be generated by uneven lighting. Hot spots, similar to dark spots, may be generated when light is unevenly applied to the background. Reflections may occur when the surface of the background produces concentration in the reflected light. Reflected green light may also partially illuminate the subject interfering with the chroma key process. Additionally, if a monochromatic green screen is used, imperfections in the green color generated by the screen may also be responsible for uneven lighting and color characteristics. Alternatively, if a backing wall or cloth associated to a bright lighting system (of the backing wall or cloth) is used, imperfections in the backing wall (or cloth) and/or the associated bright lighting system may also be responsible for the shadowed area(s).

Various solutions have been implemented for avoiding or compensating the unwanted shadowed area(s) in the generated monochromatic color background. However, those prior art solutions require lighting technicians to identify and manually correct the shadowed areas by repositioning or recalibrating lighting in front of the green screen, Therefore, there is a need for a new apparatus for backdrop rear-illumination, as well as an active green screen equipped therewith and a method for dynamic backdrop rear-illumination.

SUMMARY

According to a first aspect, the present disclosure provides a backdrop rear-illumination apparatus. The backdrop rear-illumination apparatus comprises a light assembly and a light controller. The light assembly comprises one or more light-emitting device, a light emitted by each light-emitting device first passing through a diffusing material and then passing through a green screen. The light controller comprises at least one light driver for controlling at least one operating parameter of the one or more light-emitting device. The light controller further comprises at least one user interface or a light remote control module for respectively actuating the at least one light driver.

According to a second aspect, the present disclosure provides an active green screen. The active green comprises a green screen, a diffusing material and a backdrop rear-illumination apparatus, the backdrop rear-illumination apparatus comprising a light assembly and a light controller. The light assembly comprises one or more light-emitting device, a light emitted by each light-emitting device first passing through the diffusing material and then passing through the green screen. The light controller comprises at least one light driver for controlling at least one operating parameter of the one or more light-emitting device. The light controller further comprises at least one user interface or a light remote control module for respectively actuating the at least one light driver.

According to a third aspect, the present disclosure provides a method for dynamic backdrop rear-illumination. The method comprises generating one or more light control command. Generating the one or more light control command comprises displaying a graphical user interface (GUI) on a display of a computing device, receiving by a processing unit of the computing device user interaction data generated by interactions of a user with the GUI and processing by the processing unit of the computing device the user interaction data to generate one or more light control command. Alternatively, generating the one or more light control command comprises extracting by the processing unit of the computing device background image data from images captured by a camera and processing by an algorithm executed by the processing unit of the computing device the background image data to generate one or more light control command. The method comprises transmitting the one or more light control command to a backdrop rear-illumination apparatus via a communication interface of the computing device. The method comprises receiving the one or more light control command at the backdrop rear-illumination apparatus via a communication interface of the backdrop rear-illumination apparatus. The method comprises processing by a processing unit of the backdrop rear-illumination apparatus the one or more control command to generate control signals for controlling at least one operating parameter of at least one light-emitting device of the backdrop rear-illumination apparatus.

BRIEF DESCRIPTION OF THE DRAWINGS

Embodiments of the disclosure will be described by way of example only with reference to the accompanying drawings, in which:

FIG. 1 illustrates known defects of a traditional front lit green screen;

FIGS. 5A, 5B and 5C provide schematic representations of components of the backdrop rear-illumination apparatus of FIGS. 2A and 3A;

FIG. 11 represents independently controlled groups of light-emitting devices supported by the backdrop rear-illumination apparatus of FIGS. 2A and 4A and corresponding areas in an image captured by the camera of FIG. 2A;

DETAILED DESCRIPTION

Figure 2A:
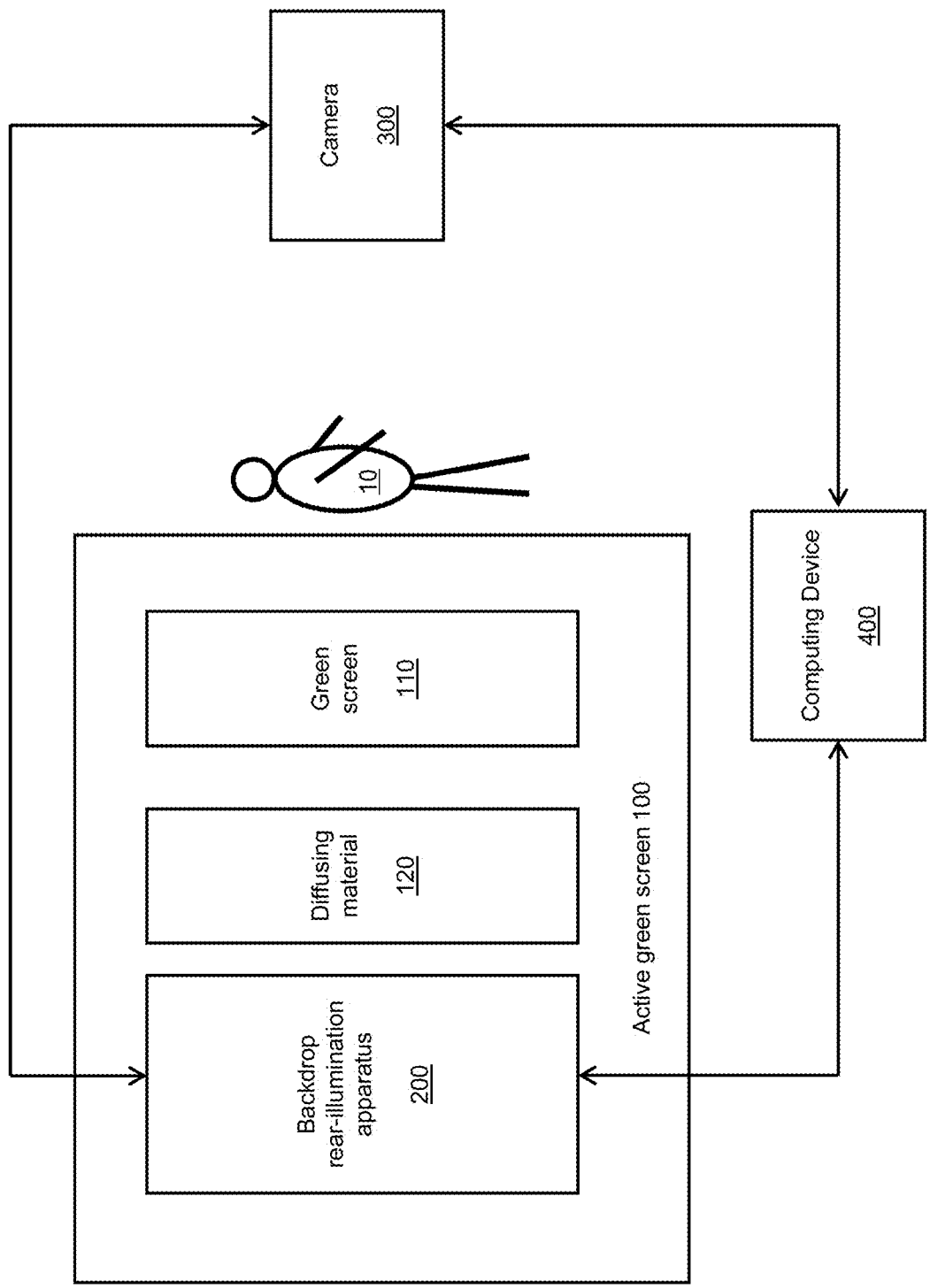
FIG. 2A is a schematic representation of an active green screen comprising a backdrop rear-illumination apparatus.

The foregoing and other features will become more apparent upon reading of the following non-restrictive description of illustrative embodiments thereof, given by way of example only with reference to the accompanying drawings.

Various aspects of the present disclosure generally address one or more of the problems related to the chroma key compositing, to avoid well known defects, such as the presence of shadowed area(s), dark spots, hot spots, reflections and reflected green color on a subject, uneven color due to material characteristics or uneven lighting, in the background of images/videos captured by a camera when performing chroma key com positing. An active green screen comprising a backdrop rear-illumination apparatus, a diffusing material and a green screen is used to avoid these well-known defects via dynamic rear-illumination of the green screen. In the rest of the disclosure, the terminology images will encompass still images (e.g. photos) and images belonging to a video.

Traditional Green Screen

FIG. 1 illustrates a traditional front lit green screen 20, illuminated by one or more light source 50 (e.g. two in FIG. 1) positioned in front of the green screen 20, as is well known in the art. A subject 10 is positioned in front of the traditional green screen 20 and a camera 300 captures images of the person 10. Some of the aforementioned well-known defects are illustrated in FIG. 1.

Figure 2B:
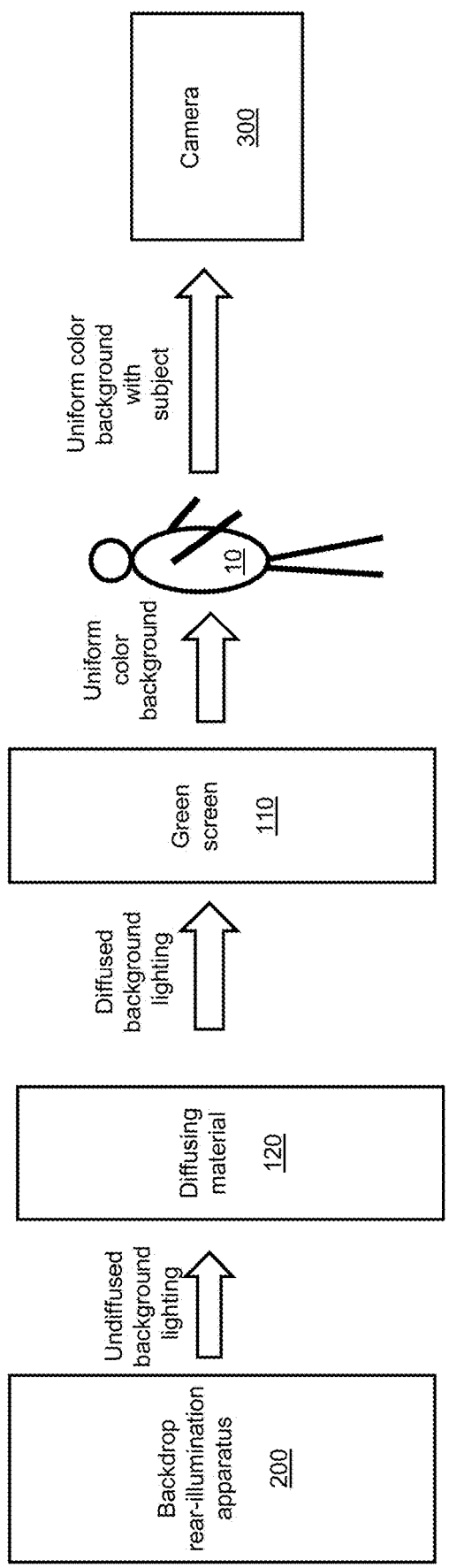
FIG. 2B is a schematic representation describing lighting properties between the various components of the active green screen of FIG. 2A.
Figure 2C:
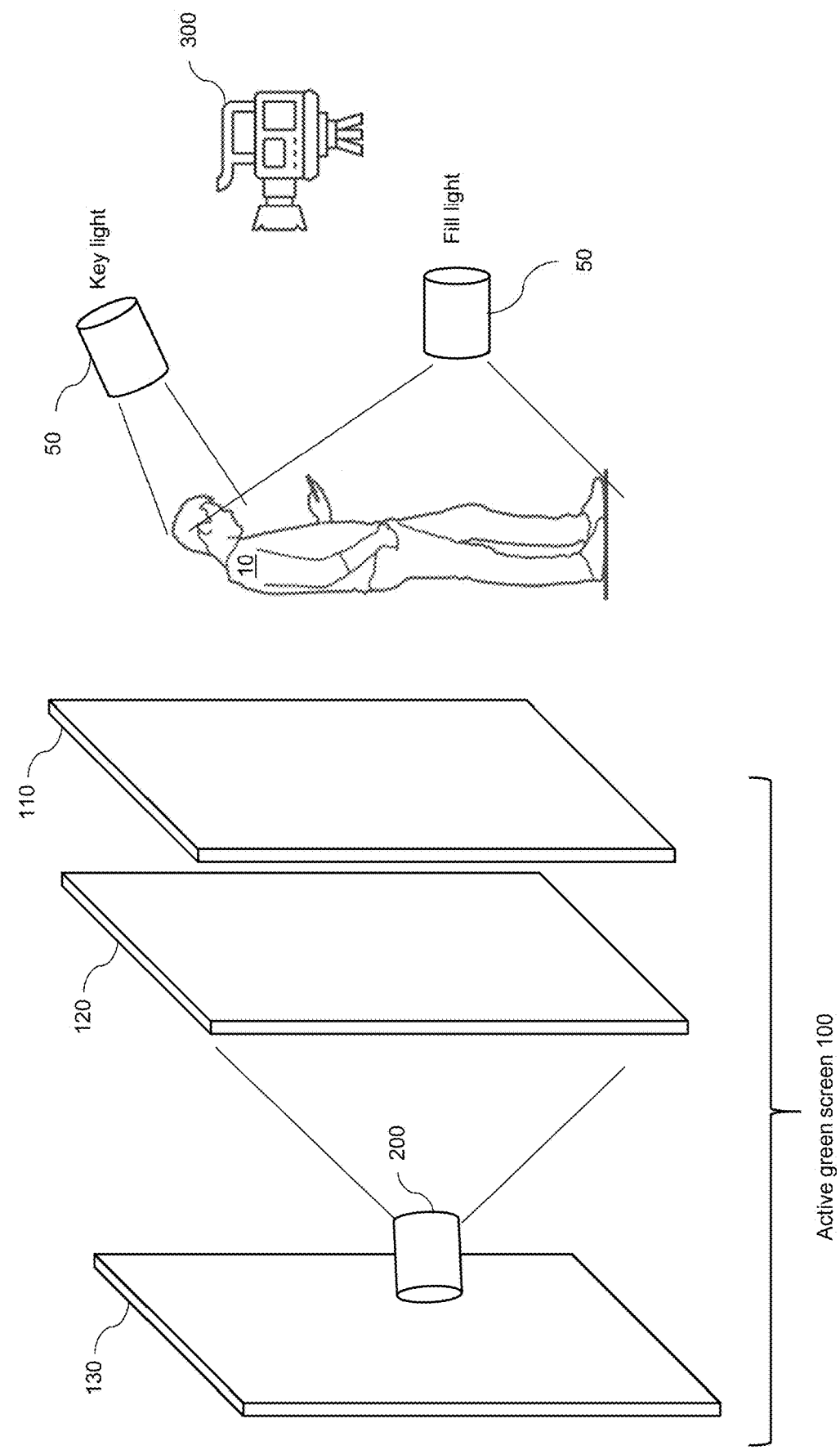
FIG. 2C is another representation of the active green screen of FIG. 2A.

Active Green Screen Comprising a Green Screen, a Diffusing Material and a Backdrop Rear-Illumination Apparatus Reference is now made concurrently to FIGS. 2A-E, 3A-B, 4A-B and 5A-5C, where FIGS. 2A, 2B and 2C represent an environment for performing chroma key compositing by means of an active green screen 100 comprising three components. FIGS. 2A and 2B provide a schematic representation of the components of the environment for performing chroma key compositing, while FIG. 2C provides a realistic representation of the components illustrating the differences with the prior art environment of FIG. 1.

As illustrated in FIG. 2A, the active green screen 100 comprises a green screen 110, a diffusing material 120 and a backdrop rear-illumination apparatus 200. The subject 10 is positioned in front of the green screen 110, between the green screen 110 and the camera 300. By contrast to the traditional configuration illustrated in FIG. 1, the green screen 110 is back lit instead of being front lit.

The diffusing material 120 is positioned behind the green screen 110. The backdrop rear-illumination apparatus 200 is positioned behind the diffusing material 120. Alternatively, the backdrop rear-illumination apparatus 200 is at least partially integrated to the diffusing material 120.

As illustrated in FIG. 2B, the backdrop rear-illumination apparatus 200 emits a background lighting. The background lighting for implementing the present dynamic backdrop rear-illumination may be monochromatic (e.g. a monochromatic green, a monochromatic blue, etc.) or broad spectrum (e.g. white, a combination of Red, Green and Blue (RGB) color components as is well known in the art, etc.). Thus, although the terminology active green screen 100 and green screen 110 is used in reference to the commonly used terminology in the field, the resulting background lighting is not necessarily green.

The background lighting first passes through the diffusing material 120, then passes through the green screen 110. The output of the green screen 110 is a uniform color background for the subject 10. The camera 300 captures a combination of the uniform color background and the image generated by the subject 10.

The green screen 110 is generally made of a fabric (e.g. a cloth), with a rigid structure for supporting the fabric. For example, the fabric is embedded in a rectangular frame made of a rigid material (e.g. wood, plastic, metal, etc.).

The diffusing material 120 is used to spread (scatter) the light generated by the backdrop rear-illumination apparatus 200 to generate a uniform illumination of the front of the green screen 110. The diffusing material 120 comprises one or more layer (e.g. 1, 2 or 3 layers) of a material having the following properties: the material is partially translucent and diffuses light. In a first configuration, each layer of the diffusing material 120 has the same color (e.g. white, colored to match a desired monochromatic screen color, etc.). In another configuration, different colors are used for the layers of the diffusing material 120 (e.g. a combination of white and color(s) for matching the desired monochromatic screen color). The layers of the diffusing material 120 may be made of the same material or made of different complimentary materials. For example, the diffusing material 120 may be made of one or more layer of plastic, acrylic, glass, a combination thereof, etc. The layers of the diffusing material 120 may have the same diffusing properties, or complimentary diffusing properties.

Figure 2D:
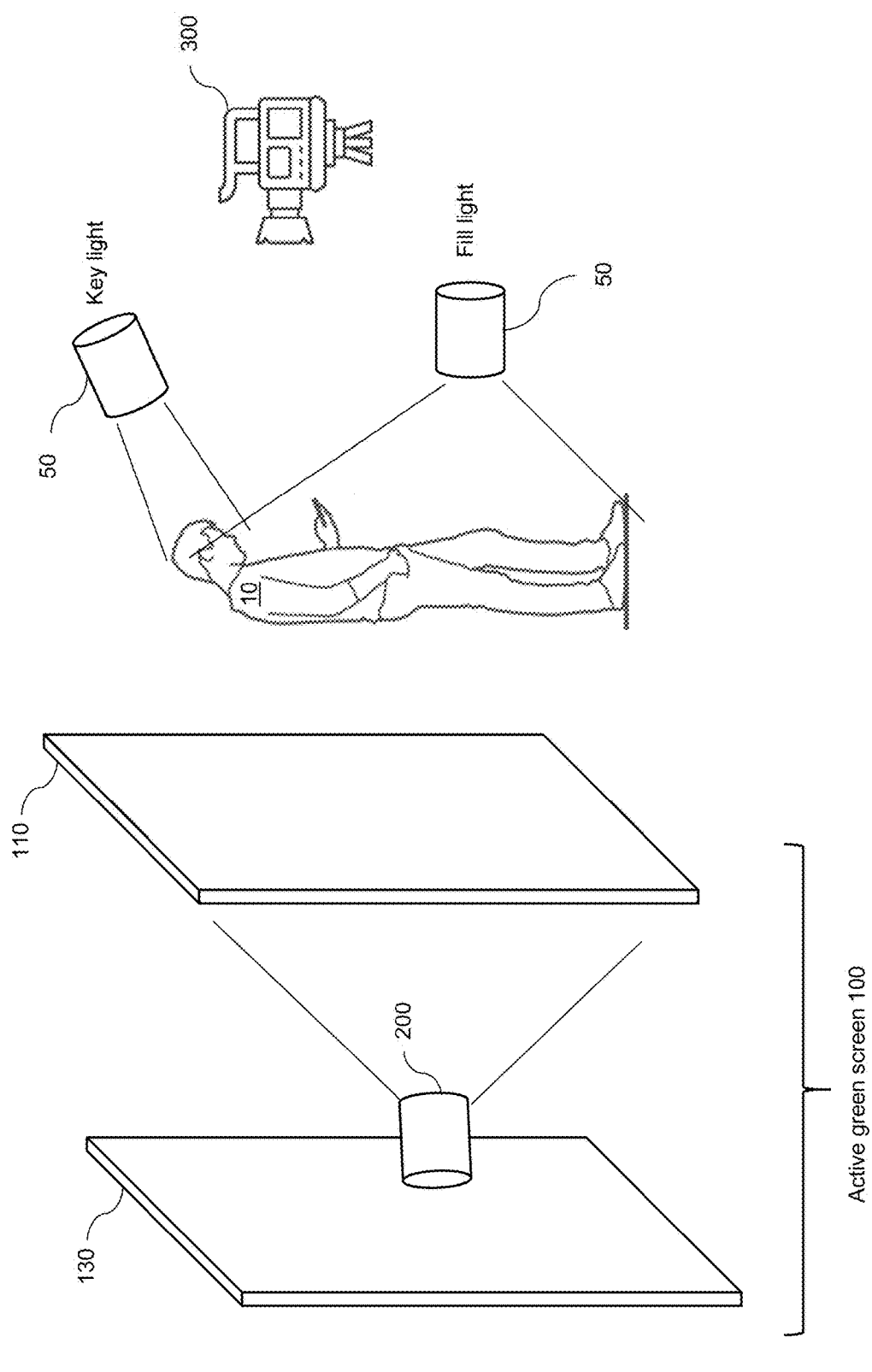
FIG. 2D is still another representation of the active green screen of FIG. 2A where a diffusing material is not used.
Figure 3A:
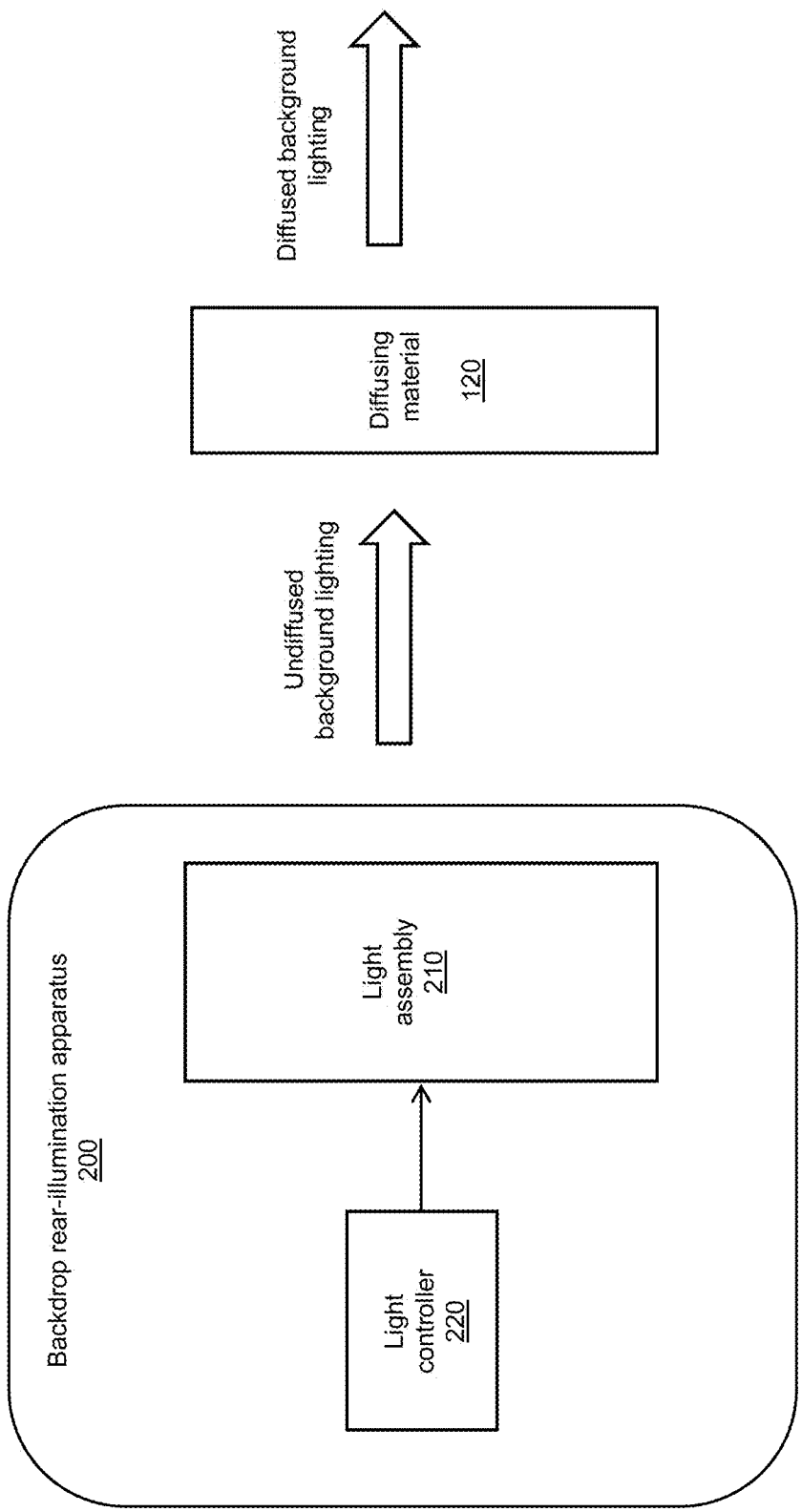
FIGS. 3A and 3B represent components for the backdrop rear-illumination apparatus and diffusing material of FIG. 2A.
Figure 3B:
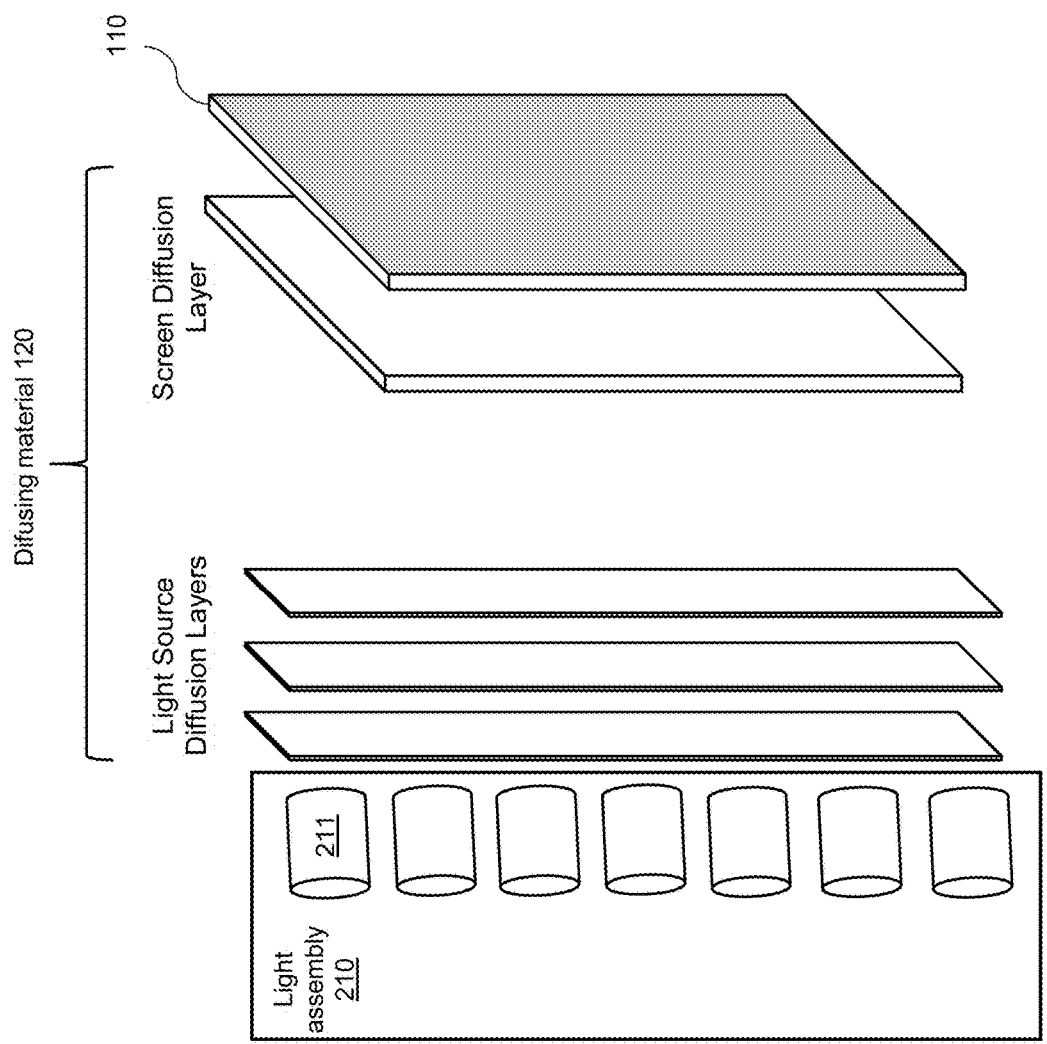

In a first implementation, the layer(s) of diffusing material 120 are applied in close proximity to the light source of the backdrop rear-illumination apparatus 200. In a second implementation, the layer(s) of diffusing material 120 are applied in close proximity to the green screen 110. In a third implementation, some of the layers of diffusing material 120 are applied in close proximity to the light source of the backdrop rear-illumination apparatus 200 and some of the layers of diffusing material 120 are applied in close proximity to the green screen 110 (as illustrated in FIG. 3B). In still another alternative or complementary implementation, the backdrop rear-illumination apparatus 200 comprises other means for performing the diffusion, such as lens(es), diffraction grid(s), frosting optic(s), Fresnel lens(es), etc. In yet another alternative implementation, the active green screen 100 does not include any diffusing material 120, as illustrated in FIG. 2D. All the properties and functionalities of the active green screen 100 and backdrop rear-illumination apparatus 300 which are described in the present disclosure are applicable with or without the presence of the diffusing material 120.

Optionally, as illustrated in FIG. 2C, the backdrop rear-illumination apparatus 200 further comprises a reflective backing material 130 positioned behind the backdrop rear-illumination apparatus 200. The reflective backing material 130 is made of or comprises a reflective surface capable of scattering the light generated by the backdrop rear-illumination apparatus 200 and improve the diffusion of the light through the diffusion material 120.

Although represented as separate components in FIG. 2C, the green screen 110, diffusing material 120, backdrop rear-illumination apparatus 200 and optionally the reflective backing material 130 can be assembled together to form the active green screen 100. For example, the active green screen 100 may take the form of a substantially cubic assembly, the green screen 110 and reflective backing material 130 forming two opposite sides of the cube. The four other sides of the cube (not represented in FIG. 2C) extend between the green screen 110 and reflective backing material 130. The four other sides of the cube may be made of or comprise (at least partially) an internal reflective surface also capable of scattering the light generated by the backdrop rear-illumination apparatus 200 and improve the diffusion of the light through the diffusion material 120.

Figure 2F:
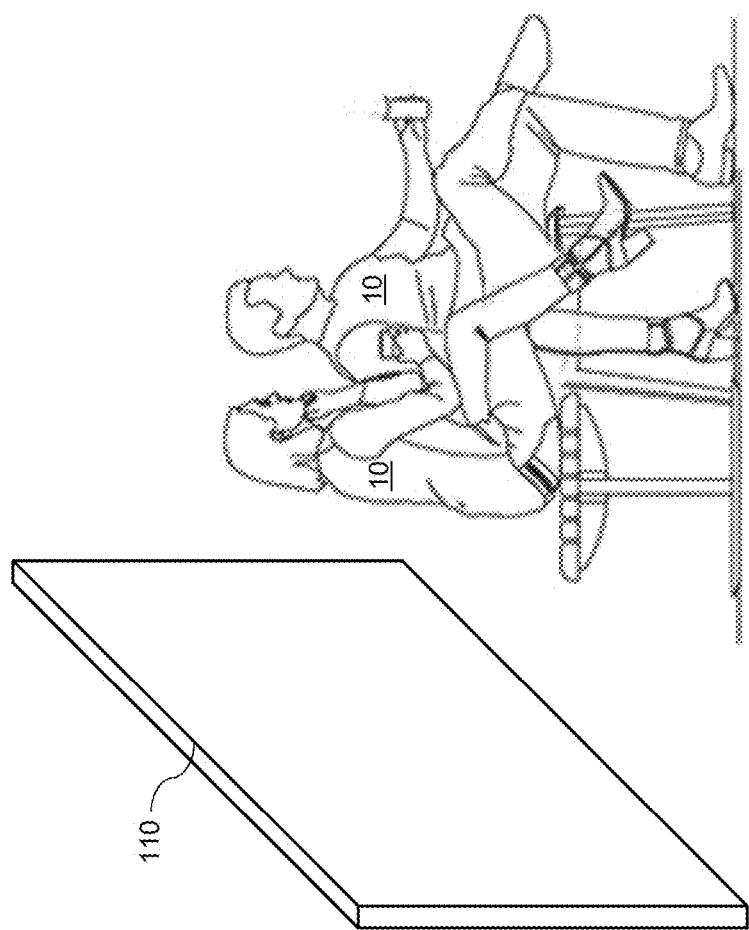
FIGS. 2E and 2F respectively illustrate a vertical and a horizontal orientation of the active green screen represented in FIG. 2C.
Figure 2E:
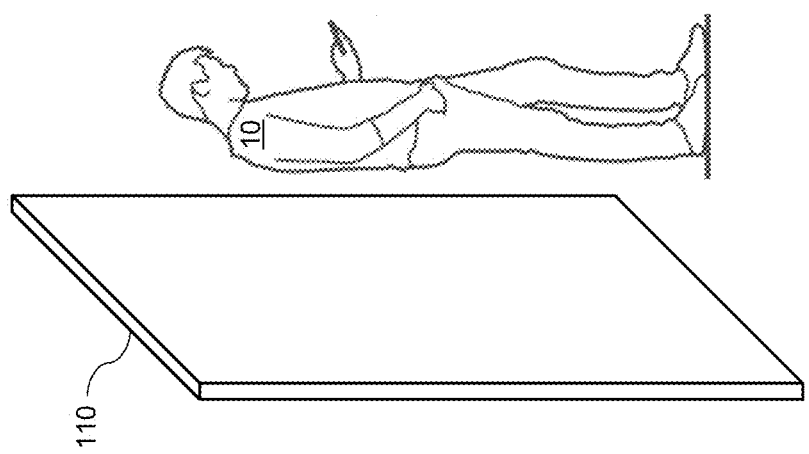

The orientation of the active green screen 100 (or at least of the green screen 110) may be vertical, horizontal, or at an angle with respect to the horizontal or vertical. The orientation is adapted to provide the most suited background for the subject(s) 10 positioned in front of the green screen 110. FIG. 2E is a simplified representation of the active green screen of FIG. 2C, illustrating a vertical orientation of the green screen 110/active green screen 100. FIG. 2F is a simplified representation of the active green screen of FIG. 2C, illustrating a horizontal orientation of the green screen 110/active green screen 100.

Examples of supporting structures for supporting the active green screen 100 comprise a tripod, a standing support, a free-standing support (e.g. adjustable feet), a hanging support (e.g. one or more hook), a mechanical attachment, etc.

Description of the Backdrop Rear-Illumination Apparatus

With respect to the backdrop rear-illumination apparatus 200, several implementations may be considered. An exemplary implementation is illustrated in FIG. 3A, with the backdrop rear-illumination apparatus 200 comprising a light assembly 210 and a light controller 220. As mentioned previously, a position of the layer(s) of the diffusing material 120 with respect to the light assembly 210 may vary. FIG. 3B illustrates an exemplary configuration where the diffusing material 120 comprises three light source diffusion layers (in close proximity to light sources 211 of the light assembly 210) and one screen diffusion layer (in close proximity to the green screen 110).

The light assembly 210 comprises one or more light-emitting device (also referred to as the light sources 211 represented in FIG. 3B) and a structure (not shown) supporting the one or more light-emitting device. The design of the light assembly 210 may vary and is implementation dependent. The supporting structure may be made of metal, wood, plastic, etc. as known in the art. Furthermore, the geometric shape of the supporting structure may also vary. The physical integration (e.g. attachment) of the light assembly 210 with the other components of the active green screen 100 may be achieved by any means applicable in the industry.

The light-emitting device can be implemented by any device capable of emitting photons in the visible and near visible spectrum. For example, the light-emitting device is an incandescent lamp. Alternatively, the light-emitting device uses a light emitting diode (LED). As mentioned previously, the light-emitting device emits a monochromatic light (e.g. green or blue) or a broad spectrum light (e.g. white or RGB light components). A combination of various technologies (e.g. incandescent lamp and LED) may be used in combination for implementing the light-emitting devices of the light assembly 210.

Figure 4A:
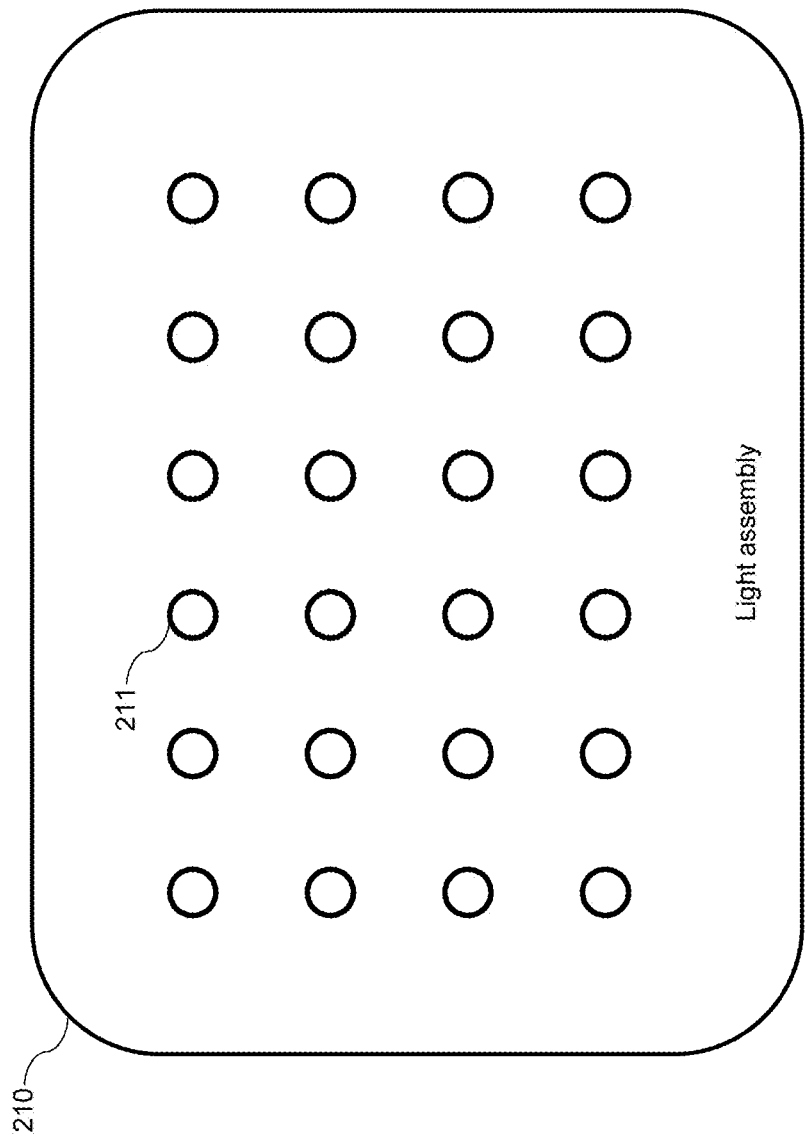
FIG. 4A provides an exemplary schematic representation of the light assembly of FIGS. 3A and 3B comprising a plurality of light-emitting devices.

The distribution of a plurality of light-emitting devices on the supporting structure of the light assembly 210 may vary. For example, a plurality of N*M light-emitting devices is supported by the supporting structure, the plurality of light-emitting devices being organized into N rows and M columns. FIG. 4A illustrates an exemplary light assembly 210 comprising 4 rows and 6 columns of light-emitting devices 211 for a total of 24 light-emitting devices 211. In an exemplary implementation, each light-emitting devices 211 uses a LED.

Figure 4B:
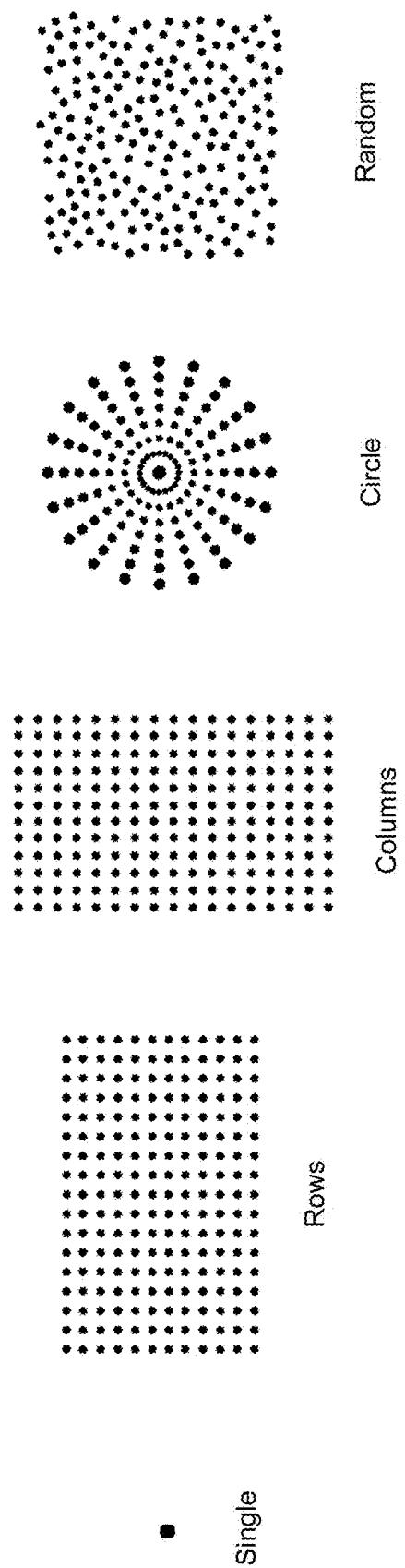
FIG. 4B illustrates various light patterns of light-emitting device(s) supported by the light assembly of FIGS. 3A and 3B.

However, the light-emitting device(s) 211 may be arranged according to various patterns resulting in corresponding emitted light patterns. FIG. 4B illustrates several examples of light patterns, including a single light-emitting device, light-emitting devices arranged in rows, light-emitting devices arranged in columns, light-emitting devices arranged in circle(s), light-emitting devices randomly arranged. A person skilled in the art would readily understand that other patterns may be used.

The combination of the lights generated by the one or more light-emitting device 211 results in the background lighting represented in FIG. 2B. In the case of a plurality of light-emitting devices 211, each light-emitting device 211 among the plurality of light-emitting devices 211 may have the same light characteristics. Alternatively, the plurality of light-emitting devices 211 may comprise at least two groups of light-emitting devices 211, each group of light-emitting devices 211 having its own light characteristics (as illustrated in FIG. 11 with four independent groups of light-emitting devices 211).

The light controller 220 controls operating parameters of the one or more light-emitting device 211 supported by the light assembly 210. The controlled operating parameters comprise at least of the following: an intensity (also referred to as brightness) of the emitted light, a color of the emitted light, and a combination thereof. In the case of a white light, the color is defined in terms of a Kelvin scale The Kelvin scale is based on the thermodynamics of a heated block of carbon and the color ranges from warm yellow to bright blue. In the case of a non-white light, the color is defined by a combination of color components, usually the RGB components.

For a non-digital light source, the intensity of a light-emitting device 211 may be controlled via a rheostat. For a digital light source (such as an LED), the intensity of a light-emitting device 211 is usually controlled via a pulse width modulator (PWM). In the case of LEDs, which are preferably operated at a fixed power, the target intensity is achieved by varying the cycles of power on and off.

In a first implementation, the light controller 220 controls the plurality of light-emitting devices 211 simultaneously (the operating parameters controlled by the light controller 220 are the same for each light-emitting device 211). In a second implementation, the light controller 220 is capable of controlling each light-emitting device 211 individually. In a third implementation, the light controller 220 is capable of controlling groups or blocks of light-emitting devices 211 individually (as illustrated in FIG. 11 with four independent groups of light-emitting devices 211). The operating parameters controlled by the light controller 220 are the same among a group of light-emitting devices 211 and may differ from the operating parameters of another group.

Local Control of the Backdrop Rear-Illumination Apparatus

Figure 5A:
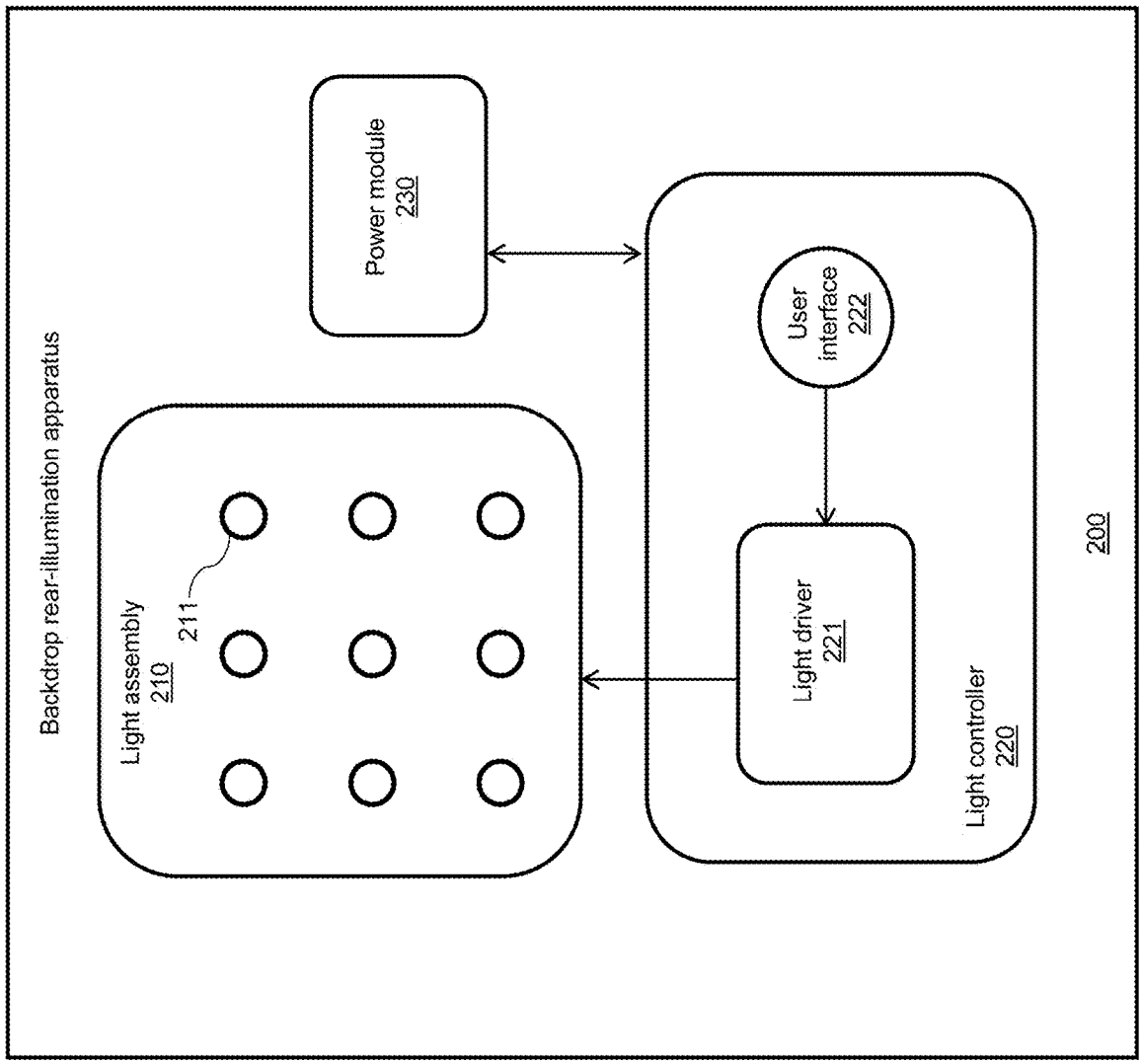

In a first implementation illustrated in FIG. 5A, the light controller 220 comprises a light driver 221 and at least one user interface 222. Although a single user interface 222 is represented in FIG. 5A, several user interfaces 222 may be used.

Each user interface 222 allows a user to adjust an operating parameter of the light-emitting device(s) 211. Examples of user interfaces 222 include a rotating knob, a slider or a numeric input.

The light driver 221 is an electrical/electronic circuit which controls the operating parameters of the light-emitting device(s) 211 of the light assembly 210. The interactions of a user with the user interface(s) 222 actuate the light driver 221 to control the operating parameters of the light-emitting device(s) 211 of the light assembly 210.

For example, the light driver 221 controls the intensity of the light emitted by the light-emitting device(s) 211 via an intensity knob 222. Turning the intensity knob 222 in one direction increases the intensity and turning the intensity knob 222 in the other direction decreases the intensity. As mentioned previously, the control of the intensity is performed by the light driver 221 via analog control or via PWM control over the light-emitting device(s) 221.

With this implementation, the intensity of the light emitted by all the light-emitting devices 211 is controlled simultaneously via a single intensity knob 222. It would not be practical to have one dedicated intensity knob for controlling the intensity of each one of the light-emitting devices 211 (unless the number of light-emitting devices 211 is not too high). However, the light-emitting devices 211 may also be organized in a small number of groups of light-emitting devices (as mentioned previously), with a dedicated intensity knob for controlling each group of light-emitting devices.

Alternatively or complementarily, the light driver 221 controls the color of the light emitted by the light-emitting device(s) 211 via a single color temperature knob 222, or via three color component knobs 222 respectively corresponding to the RGB components of the light.

The foregoing examples can be adapted to the usage of slider(s) or numeric input(s) in place of the knob(s). Furthermore, any combination of knob(s), slider(s) and numeric input(s) may be used for implementing the user interfaces 222.

The same light driver 221 is usually used for controlling all the operating parameters of the light-emitting device(s) 211. Alternatively, additional light driver(s) (not represented in FIG. 5A for simplification purposes) may be used.

As mentioned previously, the backdrop rear-illumination apparatus 200 further comprises a power module 230. The electricity provided by the power module 230 is used by the light driver 221 for powering the light-emitting device(s) 211 and other component(s) of the backdrop rear-illumination apparatus 200 if applicable. For example, the power module 230 is a power supply connectable to a power source via an electrical alternative current (AC) power line. In another example, the power module 230 is a non-rechargeable battery. In still another example, the power module 230 is a rechargeable battery, which can be recharged via an electrical alternative current (AC) power line, a Universal Serial Bus (USB) cable, or wireless electric transfer.

Remote Control of the Backdrop Rear-Illumination Apparatus

Figure 5B:
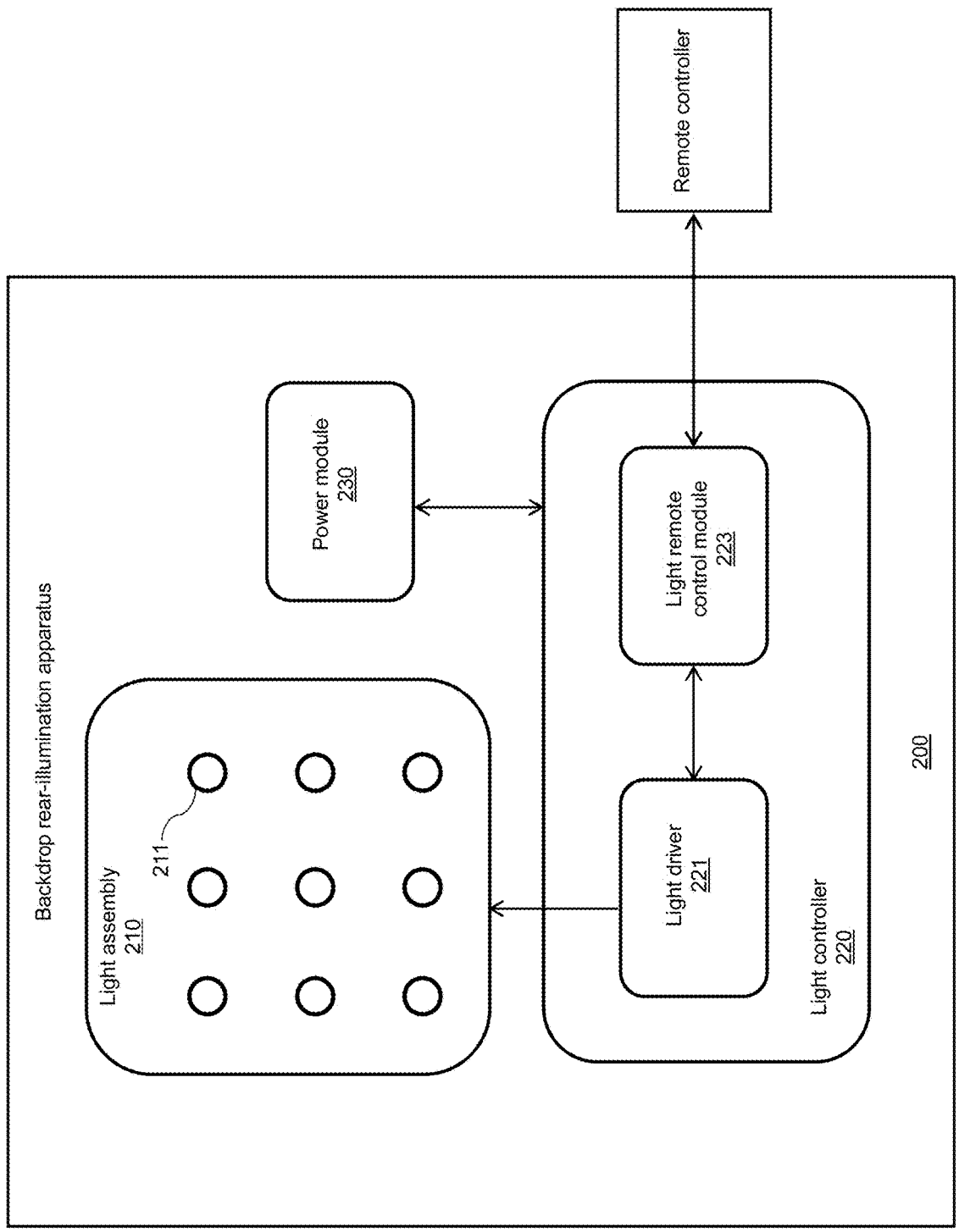

In a second implementation illustrated in FIG. 5B, the user interface 222 of the light controller 220 is replaced by a light remote control module 223 capable of interacting with a remote controller (such as the computing device 400 and/or the camera 300 of FIG. 2A), via a wired (e.g. Ethernet) or wireless (e.g. Wi-Fi, Bluetooth® or Bluetooth® Low Energy (BLE), infrared) communication protocol. Light control commands for adjusting operating parameter(s) (e.g. intensity or color) of light emitted by the light-emitting device(s) 211 under the control of the light controller 220 are received by the light remote control module 223 from the remote controller and executed by the light driver 221. Examples of remote controllers comprise a computer (desktop or laptop), a smartphone, a tablet, a camera, a server, etc.

The light remote control module 223 actuates the light driver 221 through the generation of control signals (e.g. electrical control signals) transmitted to the light driver 221. The control signals are based on the received light control commands. As mentioned previously in reference to FIG. 5A, the control signals actuate the light driver 221 to control the operating parameters of the light-emitting device(s) 211 of the light assembly 210.

FIG. 5C represents components of the light remote control module 223 of FIG. 5B, with the power module 230 of FIG. 5B being omitted for simplification purposes. The light remote control module 223 comprises a communication interface 223A for interacting with the computing device 400 and/or the camera 300. The light control commands are received from the computing device 400 via the communication interface 223A. The communication protocol supported by the communication interface 223A is one of the following: IR, Ethernet, Wi-Fi, Bluetooth or Bluetooth Low Energy, cellular, free space optical, etc. In an alternative implementation, the light control commands are received from the camera 300 by the communication interface 223A. The communication interface 223A usually comprises a combination of hardware and software executed by the hardware, for implementing the communication functionalities of the communication interface 223A. Although a single communication interface 223A is represented in FIG. 5C, the remote control module 223 may comprise several communication interfaces, each communication interface 223A supporting a given communication technology for exchanging data with other device(s) also supporting the given communication technology.

The light remote control module 223 comprises a processing unit 223B capable of executing instructions of computer program(s) for implementing functionalities of the light remote control module 223 (e.g. processing the light control commands received via the communication interface 223A and generating the corresponding control signals, which are transmitted to the light driver 221). The processing unit 223B may be implemented by one or more processor, one or more field-programmable gate array (FPGA), one or more application-specific integrated circuit (ASIC), a combination thereof, etc.

The light remote control module 223 comprises memory 223C, which is represented as a standalone component in FIG. 5C; but may also be integrated to the processing unit 223B. The memory 223C stores at least one of the following: instructions of the computer program(s) executed by the processing unit 223B, data generated by the execution of the computer program(s), data received via the communication interface 223A, etc. The light remote control module 223 may comprise several types of memories, including volatile memory (e.g. volatile Random Access Memory (RAM), etc.) and non-volatile memory (e.g. electrically-erasable programmable read-only memory (EEPROM), flash, etc.).

The light control commands received from the computing device 400 (or the camera 300) comprise light control data for controlling the operating parameters of the light-emitting devices 211 of the light assembly 210. Examples of light control data comprise data for controlling the intensity of the light emitted by the light-emitting devices 211 and data for controlling the color of the light emitted by the light-emitting devices 211. As mentioned previously, each light control command is applicable to all the light-emitting devices 211. Alternatively, if this functionality is supported by the light driver 221, each light control command is applicable to a selected light-emitting device among the plurality of light-emitting devices 211 or a selected group of light-emitting devices among the plurality of light-emitting devices 211. In this case, an identifier of the selected light-emitting device or selected group of light-emitting devices is included in the light control command. The identifier is converted by the processing unit 223B into information allowing the light driver 221 to target the selected light-emitting device 211 or selected group of light-emitting devices 211.

In another implementation not shown in the Figures, the functionalities of the light driver 221 are directly integrated to the processing unit 223B, so that the processing unit 223B directly controls the operating parameters of the light-emitting device(s) 211 of the light assembly 210. For example, the processing unit 223B (e.g. an FPGA) generates PWM signals for controlling light-emitting device(s) using LED(s). In another example, the processing unit 223B includes a digital to analog converter (DAC) for generating analog control signals for controlling light-emitting device(s) consisting of incandescent lamp(s).

In still another implementation not shown in the Figures, the backdrop rear-illumination apparatus 200 comprises a combination of user interface(s) 222 (illustrated in FIG. 5A) and light remote control module 223 (illustrated in FIGS. 5B and 5C) for controlling the light-emitting device(s) 211 through light driver(s) 221.

Description of the Components of the Computing Device

Figure 6:
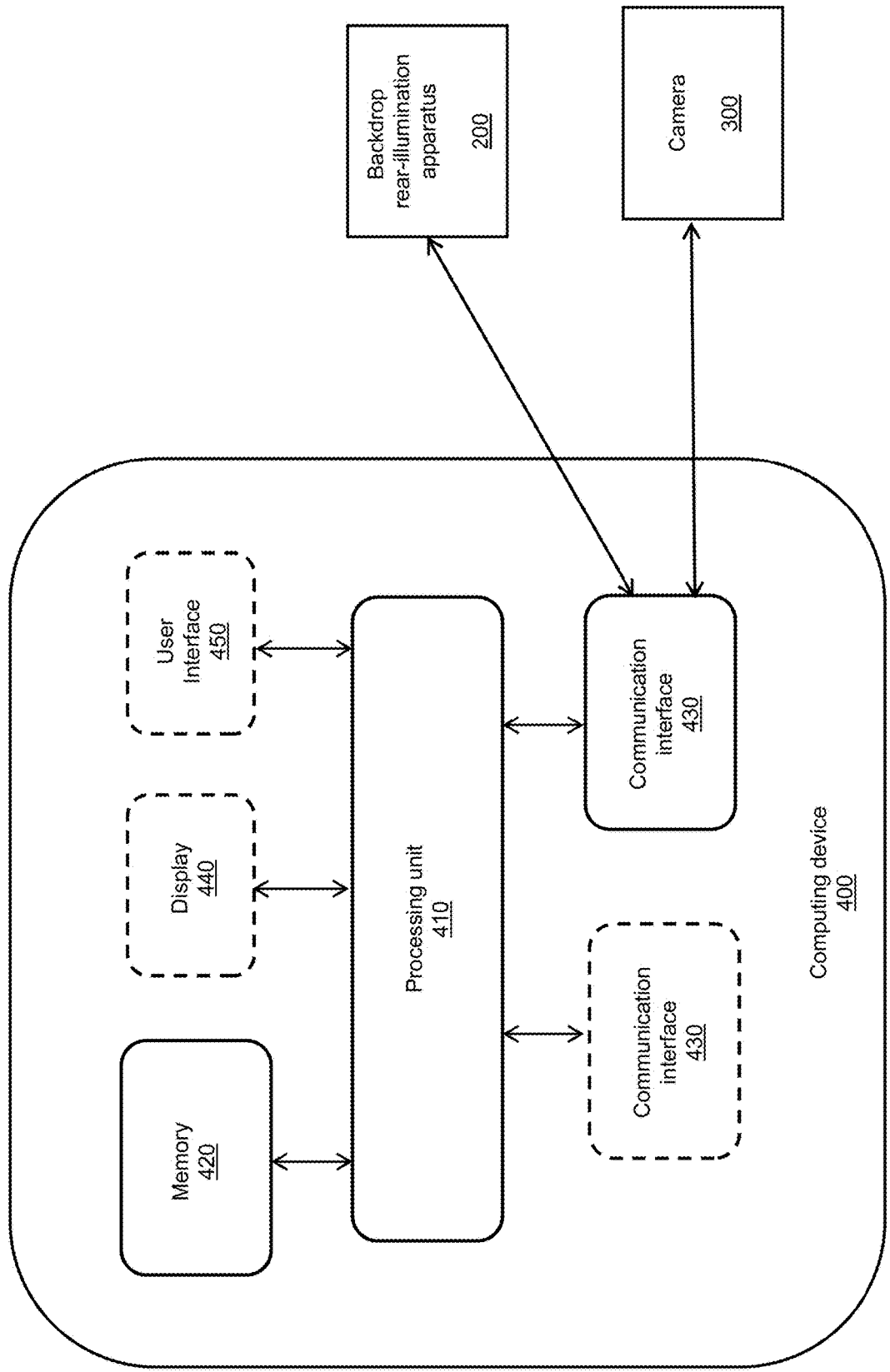
FIG. 6 provides a schematic representation of components of the computing device of FIG. 2A.

Reference is now made to FIG. 6 where components of the computing device 400 are represented.

The computing device 400 comprises a processing unit 410. The processing unit 410 comprises one or more processor (not represented in FIG. 6 for simplification purposes) capable of executing instructions of computer program(s) for implementing functionalities of the computing device 400 (e.g. receiving data, processing the received data, generating data, transmitting the generated data, etc.). Each processor may further have one or more core.

The computing device 400 comprises memory 420. The memory 420 stores instructions of the computer program(s) executed by the processing unit 410, data generated by the execution of the computer program(s), data received via a communication interface 430, etc. The computing device 400 may comprise several types of memories, including volatile memory (e.g. volatile Random Access Memory (RAM), etc.) and non-volatile memory (e.g. a hard drive, electrically-erasable programmable read-only memory (EEPROM), flash, etc.).

The computing device 400 comprises at least one communication interface 430. The one or more communication interface 430 allows the computing device 400 to exchange data with other devices, such as the camera 300 and the backdrop rear-illumination apparatus 200. Each communication interface 430 supports one of the following communication technologies: Ethernet, Universal Serial Bus (USB), cellular (e.g. a 4G or 5G cellular network), Wi-Fi, Bluetooth, Bluetooth Low Energy (BLE), etc. Each communication interface 430 supporting a given communication technology is capable of exchanging data with other device(s) also supporting the given communication technology. For example, the computing device 400 communicates with the camera 300 via a Wi-Fi network and communicates with the backdrop rear-illumination apparatus 200 via the same Wi-Fi network or via a Bluetooth (Low Energy) network. Each communication interface 430 usually comprises a combination of hardware and software executed by the hardware, for implementing the communication functionalities of the communication interface 430.

Optionally, the computing device 400 also comprises a display 440 (e.g. a standard screen, a touchscreen, etc.) and/or a user interface 450 (e.g. a keyboard, a mouse, a touchscreen, etc.).

Description of the Components of the Camera

Figure 7:
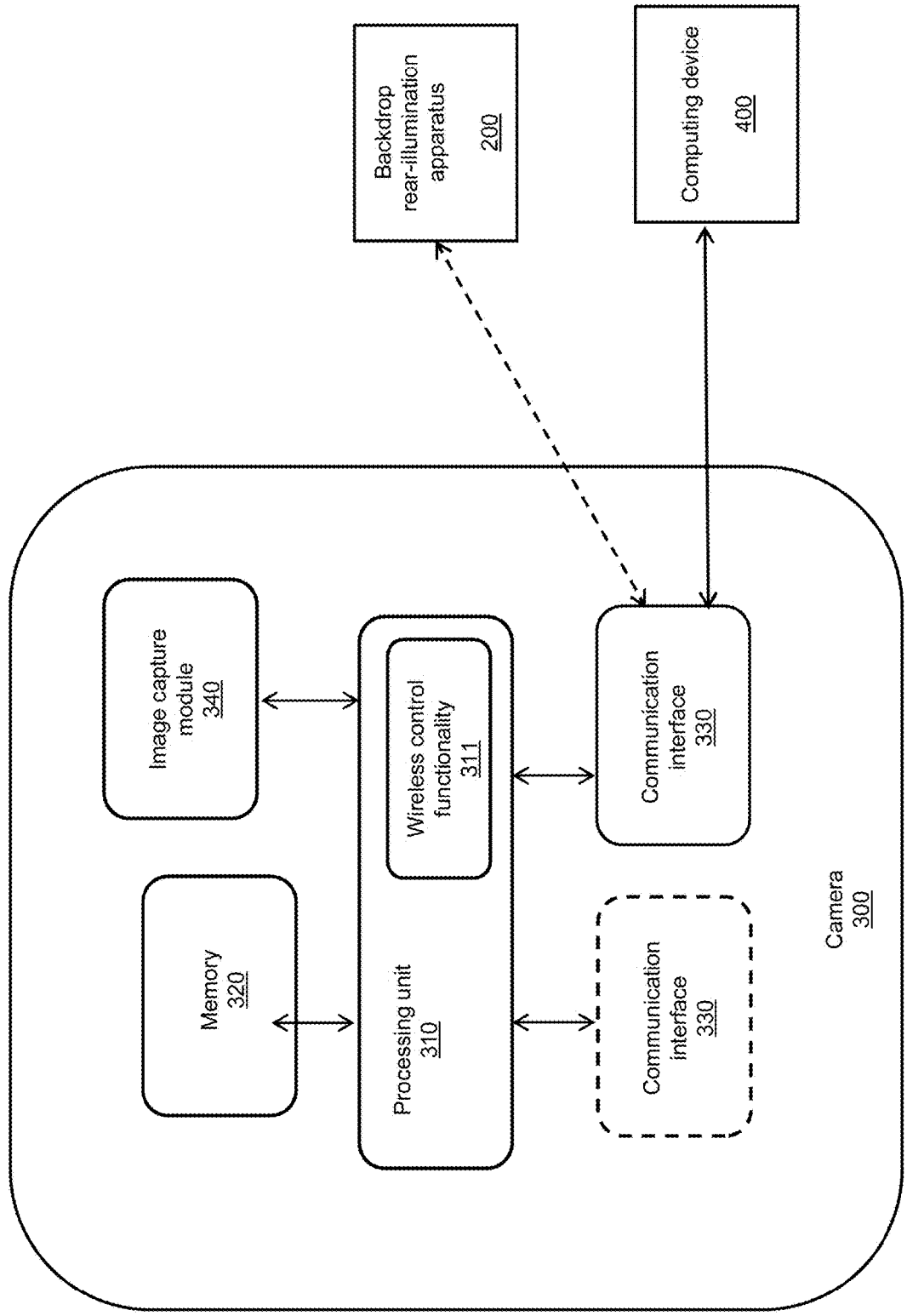
FIG. 7 provides a schematic representation of components of the camera of FIG. 2A.

Reference is now made to FIG. 7, where components of the camera 300 are represented. The representation of the camera 300 provided in FIG. 7 is simplified, since a detailed description of the functionalities and operations of a camera is out of the scope of the present disclosure, and well known in the art. The camera 300 is capable of capturing still images (e.g. photos) and/or a flow of images belonging to a video.

The camera 300 comprises an image capture module 340. Details of the implementation of the image capture module 340 will not be provided, since the functionalities of an image capture module are well known in the art. The image capture module 340 comprises optical and electronic component for capturing an optical image and converting it into a digital image.

The camera 300 comprises a processing unit 310. The processing unit 310 comprises one or more processor (not represented in FIG. 7 for simplification purposes) capable of executing instructions of computer program(s) for implementing functionalities of the camera 300 (e.g. processing the images captured by the image capture module 340, transmitting the images captured by the image capture module 340, controlling the operations of the camera 300, processing data received via a communication interface 330, etc.). Each processor may further have one or more core.

The camera 300 comprises memory 320. The memory 320 stores instructions of the computer program(s) executed by the processing unit 310, images captured by the image capture module 340, data generated by the execution of the computer program(s), data received via the communication interface 330, etc. The camera 300 may comprise several types of memories, including volatile memory (e.g. volatile Random Access Memory (RAM), etc.) and non-volatile memory (e.g. electrically-erasable programmable read-only memory (EEPROM), flash, etc.).

The camera 300 comprises at least one communication interface 330. The one or more communication interface 330 allows the camera 300 to exchange data with other devices, such as the computing device 400 and optionally the backdrop rear-illumination apparatus 200. Each communication interface 330 supports one of the following communication technologies: Ethernet, Universal Serial Bus (USB), Wi-Fi, Bluetooth®, Bluetooth® Low Energy (BLE), etc. Each communication interface 330 supporting a given communication technology is capable of exchanging data with other device(s) also supporting the given communication technology. For example, the camera 300 communicates with the computing device 400 via a Wi-Fi network and optionally communicates with the backdrop rear-illumination apparatus 200 via the same Wi-Fi network or via a Bluetooth (Low Energy) network. Each communication interface 330 usually comprises a combination of hardware and software executed by the hardware, for implementing the communication functionalities of the communication interface 330.

The camera 300 generally also comprises a display (e.g. a standard screen, a touchscreen, etc.) and a user interface 450 (e.g. control buttons, a touchscreen, etc.), which are not represented in FIG. 7 for simplification purposes.

User Based Remote Control of the Active Green Screen (and Optionally of the Front Light Source(s) and/or the Camera)

Figure 8A:
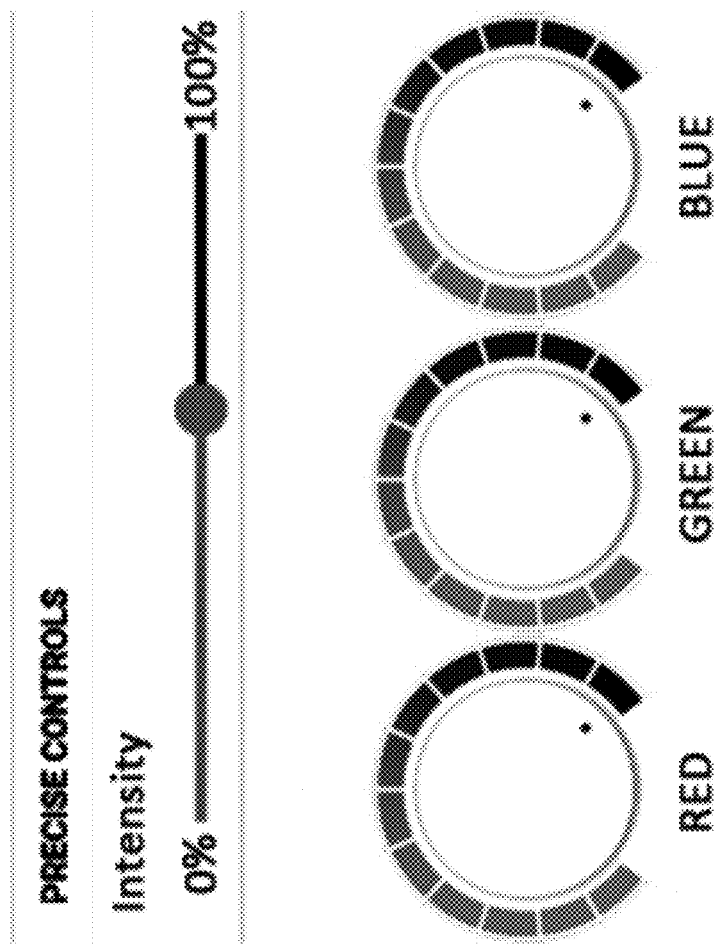
FIGS. 8A, 8B, 8C and 8D represent remote control Graphical User interfaces (GUIs) displayed by the computing device of FIGS. 2A and 6.
Figure 8D:
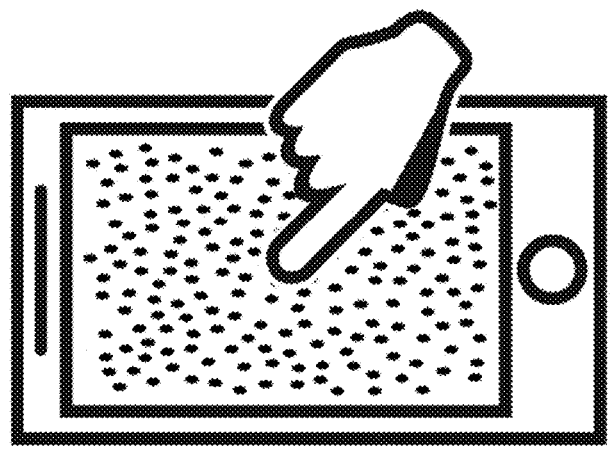
Figure 8C:
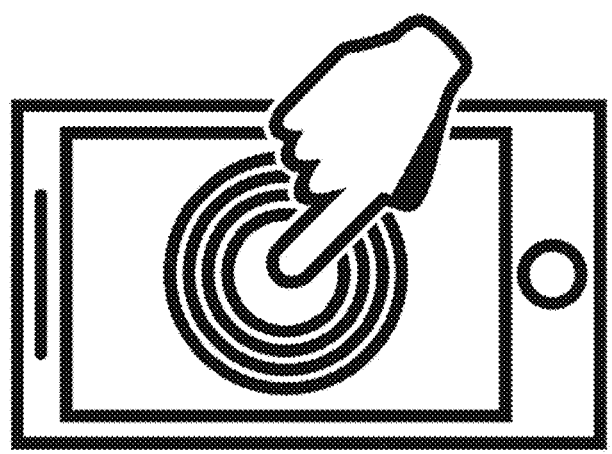
Figure 8B:
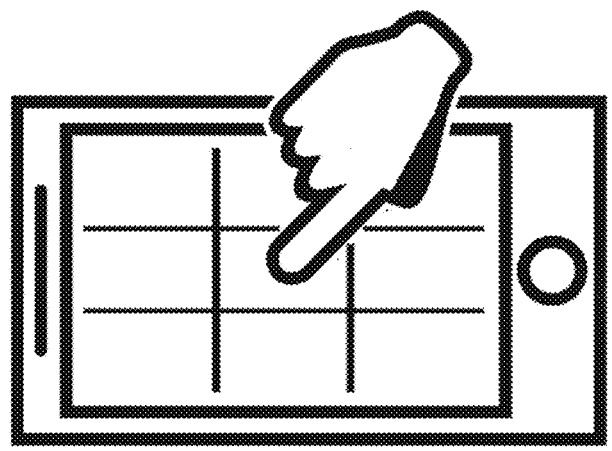
Figure 9:
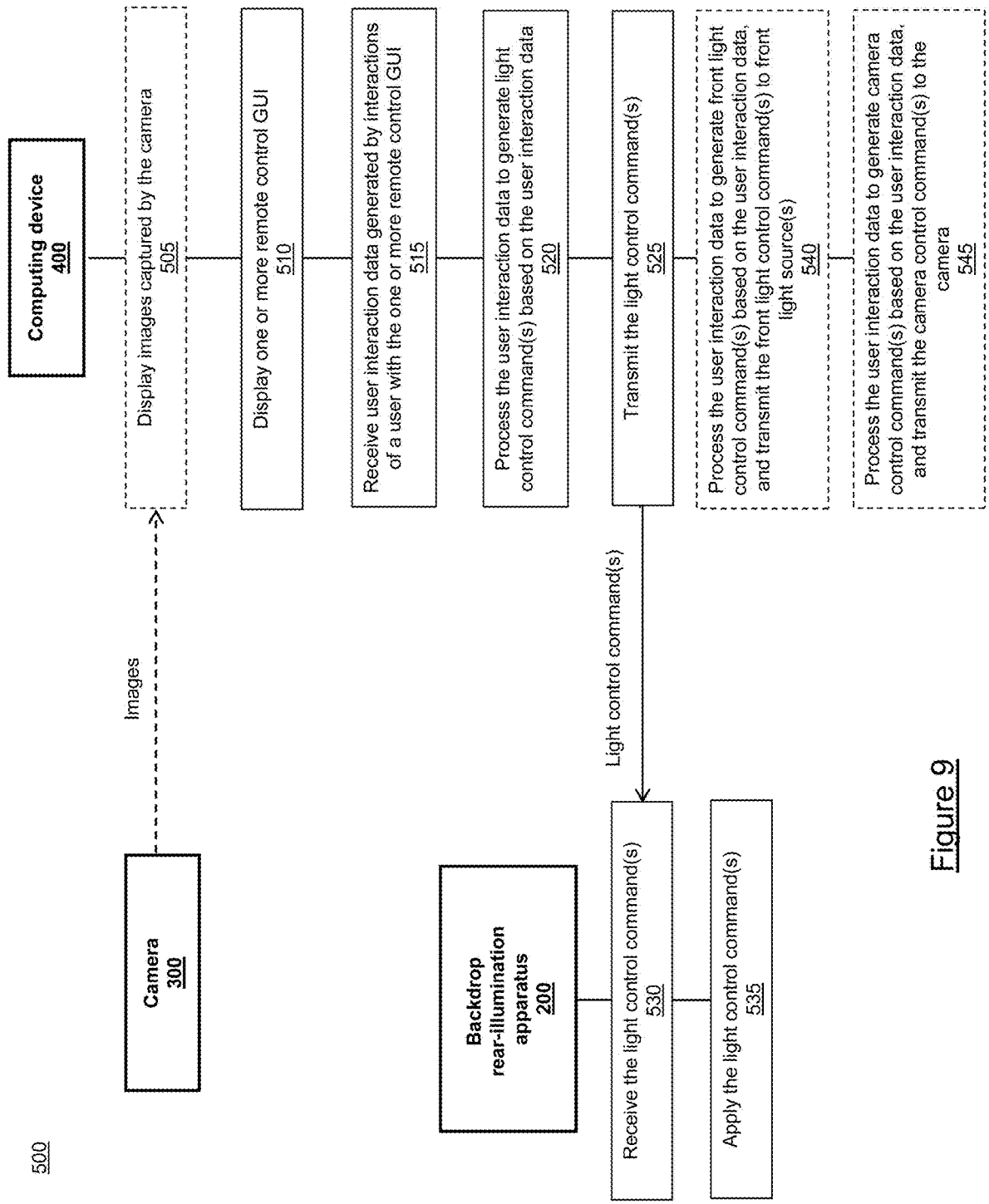
FIG. 9 represents a method for performing user based dynamic backdrop rear-illumination implemented by the computing device of FIGS. 2A and 6.

Reference is now made concurrently to FIGS. 2A, 2C, 5B, 5C, 6, 7, 8A-8 and 9, where FIGS. 8A-D represent exemplary remote control Graphical User Interfaces (GUIs) and FIG. 9 represents a method 500 for performing user based dynamic backdrop rear-illumination.

For illustration purposes, some of the steps of the method 500 are implemented by the computing device 400 represented in FIG. 6. For example, the computing device 400 is a smartphone held by the subject 10 represented in FIG. 2C. However, a person skilled in the art would readily adapt the method 500 so that these steps are implemented by the camera 300 represented in FIG. 7 instead of the computing device 400.

The processing unit 410 of the computing device 400 executes a user based remote control software. The user based remote control software implements some of the steps of the method 500. The user based remote control software displays remote control GUI(s) on the display 440 of the computing device 400. A user interacts with the remote control GUI(s) via the user interface 450 of the computing device 400. The interactions of the user with the remote control GUI(s) generate user interaction data. The user based remote control software processes the user interaction data and generates light control commands based on the user interaction data. The light control commands are transmitted via the communication interface 430 of the computing device 400. As mentioned previously, the light control commands are transmitted to the backdrop rear-illumination apparatus 200 illustrated in FIG. 5B. The processing of the light control commands by the backdrop rear-illumination apparatus 200 (more specifically the light remote control module 223 illustrated in FIG. 5C) have been described previously in details.

The light control commands comprise light control data for controlling the operating parameters of the light-emitting devices 211 of the light assembly 210 (illustrated in FIG. 5B). As mentioned previously, the light control data comprise at least one of the following: data for controlling the intensity of the light emitted by the light-emitting devices 211 and data for controlling the color of the light emitted by the light-emitting devices 211. As mentioned previously, each light control command is applicable to all the light-emitting devices 211, a selected group of light-emitting devices among the plurality of light-emitting devices 211 or a selected light-emitting device among the plurality of light-emitting devices 211.

Referring to FIG. 8A, an exemplary remote control GUI for controlling the intensity and color of the light emitted by one or more light-emitting device 211 is illustrated. The remote control GUI comprises a slider for controlling the intensity of the light, expressed as a percentage from 0 to 100%. The remote control GUI further comprises three rotational knobs for respectively controlling the value (e.g. 0 to 255) of the RGB color components of the light.

Referring to FIGS. 8B-D, exemplary remote control GUIs for selecting one or more light-emitting device 211 among the plurality of light-emitting devices 211 of the light assembly 210 are illustrated. These remote control GUIs allow a more precise match of illumination to the environment. FIG. 8B illustrates a remote control GUI where the light-emitting devices 211 are grouped by quadrant. FIG. 8C illustrates a remote control GUI where the light-emitting devices 211 are grouped by sectors. FIG. 8D illustrates a remote control GUI where the light-emitting devices 211 are individually selectable (however, individually controlled light-emitting devices 211 may be overly complicated and difficult for a human being to manage, so that an algorithm may be needed to make that process easier, as will be illustrated later in the description).

In the case where all the light-emitting devices 211 are controlled simultaneously, the remote control GUI illustrated in FIG. 8A is used for setting the intensity and/or color of the light of all the light-emitting devices 211.

In the case where the light-emitting devices 211 are controlled by groups, the remote control GUI illustrated in FIG. 8B or 8C is used for selecting a group of light-emitting devices 211. Then, the remote control GUI illustrated in FIG. 8A is used for setting the intensity and/or color of the light of all the light-emitting devices 211 of the selected group.

In the case where the light-emitting devices 211 are controlled individually, the remote control GUI illustrated in FIG. 8D is used for selecting a given light-emitting device 211. Then, the remote control GUI illustrated in FIG. 8A is used for setting the intensity and/or color of the light of the selected light-emitting device 211.

The user based remote control software can be used to control additional components of the environment, via additional remote control GUIs. In a first example, operating parameters of one or more front light source 50 illustrated in FIG. 2C are controlled by the user of the computing device 400. In the exemplary configuration illustrated in FIG. 2C, two frontal light sources 50 respectively provide key light and fill light (as is well known in the art) for frontally lighting the subject 10. The user interacts with one or more remote control GUIs dedicated to the control of the front light source(s) 50, the processing unit 410 generates corresponding front light control commands for controlling the operating parameters of the front light source(s) 50, and the front light control commands are transmitted to the front light source(s) 50 via the communication interface 430. The front light source(s) 50 are remotely controllable via a communication interface for receiving the front light control commands and a processing unit for enforcing the received front light control commands. The design of the front light source(s) 50 is at least partially similar to the design of the backdrop rear-illumination apparatus 200 illustrated in FIGS. 5B and 5C.

In a second example, operating parameters of the camera 300 are controlled by the user of the computing device 400. The user interacts with one or more remote control GUIs dedicated to the control of the camera 300, the processing unit 410 generates corresponding camera control commands for controlling the operating parameters of the camera 300, and the camera control commands are transmitted to the camera 300 via the communication interface 430. As illustrated in FIG. 7, the camera 300 is remotely controllable via the communication interface 330 for receiving the camera control commands and the processing unit 310 for enforcing the received camera control commands. Examples of operating parameters set by the user via the computing device 400 and transmitted to the camera 400 include exposure, gamma, more advanced settings such as specific color saturation or substitution, etc.

In order to assist the user of the computing device 400, a feedback may be provided to the user (e.g. displayed by the computing device 400 on the display 440) suggesting how to balance the system. For example, the images captured by the camera 300 (or at least a subset of the images) are displayed by the computing device 400 on the display 440, allowing the user to evaluate the impact of the adjustments performed via the aforementioned remote control GUIs. The images are captured by the camera 300 and transmitted to the computing device 400, received via the communication interface 430 and displayed by the processing unit 430 on the display 440.

Referring more specifically to FIG. 9, the steps of the method 500 will now be described. The method 500 is implemented by the computing device 400 and the backdrop rear-illumination apparatus 200.

The method 500 comprises the optional step 505 of displaying images captured by the camera 300 on the display 440 of the computing device 400. Step 505 is executed by the processing unit 410 of the computing device 400. The images are received via the communication interface 430 of the computing device 400. As mentioned previously, other types of feedbacks may be displayed alternatively or complementarily to the images captured by the camera 300.

The method 500 comprises the step 510 of displaying one or more remote control GUI on the display 440 of the computing device 400. Step 510 is executed by the processing unit 410 of the computing device 400.

The method 500 comprises the step 515 of receiving user interaction data generated by interactions of a user with the one or more remote control GUI (displayed at step 510). Step 515 is executed by the processing unit 410 of the computing device 400. The user interactions are performed via the user interface 450 of the computing device 400.

The method 500 comprises the step 520 of processing the user interaction data (received at step 515) to generate light control command(s) based on the user interaction data. Step 520 is executed by the processing unit 410 of the computing device 400.

The method 500 comprises the step 525 of transmitting the light control command(s) (generated at step 520) to the backdrop rear-illumination apparatus 200. Step 525 is executed by the processing 410 of the computing device 400. The transmission is performed via the communication interface 430 of the computing device 400.

The method 500 comprises the step 530 of receiving the light control command(s) (transmitted at step 525) at the backdrop rear-illumination apparatus 200. Step 530 is executed by the processing unit 223B of the light remote control module 223 of the backdrop rear-illumination apparatus 200. The reception is performed via the communication interface 223A of the light remote control module 223 of the backdrop rear-illumination apparatus 200.

The method 500 comprises the step 535 of applying the light control command(s) (received at step 530). Step 535 is executed by the processing unit 223B of the light remote control module 223 of the backdrop rear-illumination apparatus 200. Step 535 has been described previously and includes generating control signal(s) (e.g. electrical control signals) transmitted to the light driver 221 based on the received light control command(s).

The method 500 comprises the optional step 540 of processing the user interaction data (received at step 515) to generate front light control command(s) based on the user interaction data. Step 540 further comprises transmitting the front light control command(s) to the front light source(s) 50 via the communication interface 430 of the computing device 400. Step 540 is executed by the processing unit 410 of the computing device 400.

The method 500 comprises the optional step 545 of processing the user interaction data (received at step 515) to generate camera control command(s) based on the user interaction data. Step 545 further comprises transmitting the camera control command(s) to the camera 300 via the communication interface 430 of the computing device 400. Step 545 is executed by the processing unit 410 of the computing device 400.

Algorithm Based Remote Control of the Active Green Screen

Figure 10A:
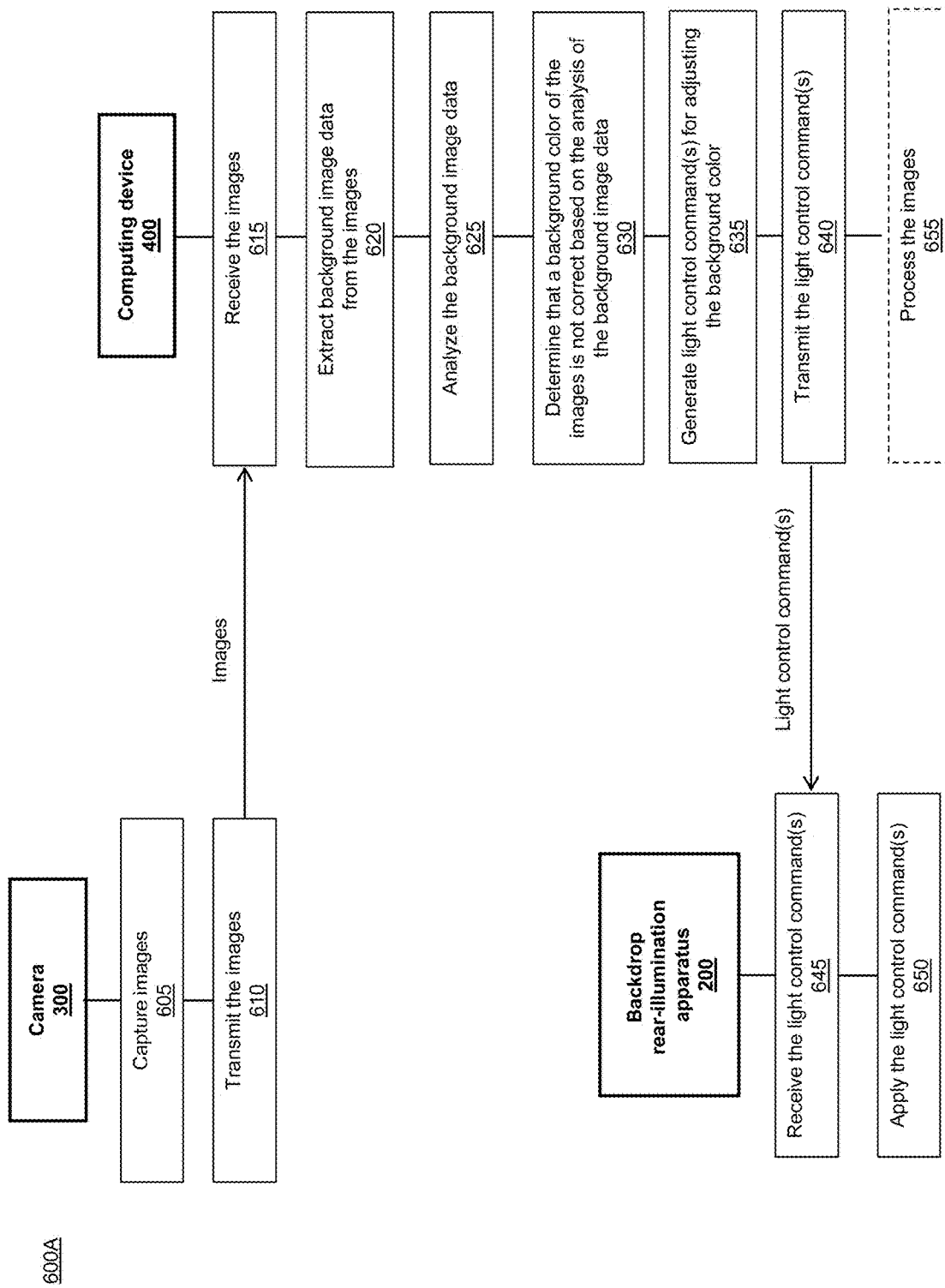
FIGS. 10A, 10B and 10C represent different implementations of a method for performing algorithm based dynamic backdrop rear-illumination implemented by elements of the system represented in FIG. 2A.

Referring now concurrently to FIGS. 2A, 2C, 5B, 5C, 6, 7, 10A and 11, a method 600A for performing algorithm based dynamic backdrop rear-illumination is illustrated in FIG. 10A. The method 600A is implemented by the computing device 400 (illustrated in FIG. 6), with some of its steps performed by the camera 300 (illustrated in FIG. 7) and the backdrop rear-illumination apparatus 200 (illustrated in FIGS. 5B and 5C).

The method 600A comprises the step 605 of capturing images. Step 605 is performed by the camera 300. More specifically, this step involves the capture of optical images by the image capture module 340, the transformation of the optical images into digital images by the image capture module 340, and optionally the processing of the digital images by the processing unit 310. Step 605 will not be detailed since it is well known in the art. In the rest of the description, the terminology image will refer to the digital images generated by the camera 300. Each pixel of the image has three intensity values (e.g. three integers between 0 and 255) for respectively representing each one of the three RGB color components of the image. An exemplary digital representation of an image having M columns and N rows is a 3D array of pixel intensity values having M columns and N rows (M and N being integers), and a third dimension of size 3 for the RGB color components.

The method 600A comprises the step 610 of transmitting the images (captured at step 605) to the computing device 400. Step 610 is executed by the processing unit 310 of the camera 300. The transmission is performed via the communication interface 330 of the camera 300.

The method 600A comprises the step 615 of receiving the images (transmitted at step 610) at the computing device 400. Step 615 is executed by the processing unit 410 of the computing device 400. The reception is performed via the communication interface 430 of the computing device 400.

The background of the images has a background color, which is generated by the active green screen 100 illustrated in FIGS. 2A, 2B and 2C. The objective of the active green screen 100 is to have a nominal background color. One functionality of the present method 600A is to detect that the background color of the images is not compliant with the nominal background color and to actuate the backdrop rear-illumination apparatus 200 to correct this non-compliance. This functionality is implemented by the following steps 620, 625, 630 and 635 of the method 600A.

The nominal background color is a configuration parameter (e.g. a nominal value for each of the RGB color components) stored in the memory 420 of the computing device 400. The nominal background color may be updated (e.g. via the user interface 450 or via an update command received via the communication interface 430).

The method 600A comprises the step 620 of extracting background image data from the images (received at step 615). Step 620 is executed by the processing unit 410 of the computing device 400. This step is well known in the art of chroma key compositing.

An exemplary implementation of step 620 is the following. Considering a given image, the color of each pixel of the given image is compared to the nominal background color, and based on the result of the comparison, it is determined whether the pixel belongs to the background or not.

For instance, the nominal background color is green with a nominal Red intensity value of 0, a nominal Green intensity value of 200 and a nominal Blue intensity value of 0. A pixel for which the Red intensity value is between 0 and 5, the Green intensity value is between 195 and 215 and the Blue intensity value is between 0 and 5 is considered to be part of the background.

An exemplary implementation of the background image data is a 3D array of pixel intensity values having M columns and N rows, and a third dimension of size 3 for the RGB color components. The RGB color components of a pixel not belonging to the background are set to 0, while the RGB color components of a pixel belonging to the background are those of the original image (received at step 615).

The method 600A comprises the step 625 of analyzing the background image data (extracted at step 620). Step 625 is executed by the processing unit 410 of the computing device 400.

The method 600A comprises the step 630 of determining that a background color of the images is not correct based on the analysis of the background image data (performed at step 625). Step 630 is executed by the processing unit 410 of the computing device 400.

Steps 625 and 630 are closely related and are generally implemented by a background analysis algorithm executed by the processing unit 410. A person skilled in the art would readily understand that the background analysis algorithm may be implemented in various ways.

For example, the background analysis algorithm calculates a Mean Square Error (MSE) using the background image data. The calculation of the MSE takes into consideration the RGB intensity values of each pixel belonging to the background, which are compared to the nominal RGB intensity values of the nominal background color. One output of the algorithm is a determination that the background color is not correct if the calculated MSE is greater (or equal) than a threshold, and a determination that the background color is correct otherwise.

The following steps of the method 600A address the case where the background color is not correct. In the case where the background color is correct, steps 635 to 650 are not performed; only step 655 is performed.

The method 600A comprises the step 635 of generating light control command(s) for adjusting the background color. Step 635 is executed by the processing unit 410 of the computing device 400.

As mentioned previously, the light control command(s) comprises light control data for controlling the operating parameters of the light-emitting devices 211 of the light assembly 210 (illustrated in FIG. 5B). As mentioned previously, the light control data comprise at least one of the following: data for controlling the intensity of the light emitted by the light-emitting devices 211 and data for controlling the color of the light emitted by the light-emitting devices 211. As mentioned previously, each light control command is applicable to all the light-emitting devices 211, a selected group of light-emitting devices among the plurality of light-emitting devices 211 or a selected light-emitting device among the plurality of light-emitting devices 211.

Step 635 may be implemented in various ways. For example, the outputs of the background analysis algorithm (executed at steps 625 and 630) comprises at least one metric, such as the aforementioned MSE. The light control data are generated based on the value of the at least one metric. For example, a correspondence data structure (e.g. a correspondence table) is stored in the memory 420 of the computing device 400, providing a correspondence between values of the at least one metric and corresponding values of the light control data. Alternatively, an algorithm is used for calculating the light control data based on the at least one metric. In an exemplary implementation, the at least one metric comprises an MSE value for each one of the RGB color components. Corresponding light control data are generated for each one of the RGB color components of the light-emitting devices 211.

Optionally, instead of taking into consideration all the background image data extracted at step 620, only a sample of the background image data are used for performing steps 625, 630 and 635. For instance, referring to the previous exemplary implementation of the background analysis algorithm, only a sample of the pixels identified as being part of the background of the images are taken into consideration (e.g. one background pixel out of ten).

The method 600A comprises the step 640 of transmitting the light control command(s) (generated at step 635) to the backdrop rear-illumination apparatus 200. Step 640 is executed by the processing unit 410 of the computing device 400. The transmission is performed via the communication interface 430 of the computing device 400.

The method 600A comprises the step 645 of receiving the light control command(s) (transmitted at step 640) at the backdrop rear-illumination apparatus 200. Step 645 is executed by the processing unit 223B of the light remote control module 223 of the backdrop rear-illumination apparatus 200. The reception is performed via the communication interface 223A of the light remote control module 223 of the backdrop rear-illumination apparatus 200.

The method 600A comprises the step 650 of applying the light control command(s) (received at step 645). Step 650 is executed by the processing unit 223B of the light remote control module 223 of the backdrop rear-illumination apparatus 200. Step 650 has been described previously and includes generating control signal(s) (e.g. electrical control signals) transmitted to the light driver 221 based on the received light control command(s).

The method 600A comprises the optional step 655 of processing the images (received at step 615). Step 655 is executed by the processing unit 410 of the computing device 400. This step is independent of the dynamic backdrop rear-illumination functionality of the method 600A (and is also performed when steps 635-650 are not performed).

For example, step 655 comprises displaying the (raw) images (received at step 615) on the display 440 of the computing device 400. In this case, the displayed (raw) images are used as a feedback for monitoring the execution of the dynamic backdrop rear-illumination functionality.

In another example, step 655 comprises processing the images (received at step 615) to replace the background of the images by a replacement background image (e.g. a seaside landscape, a mountain landscape, a city line image, etc.). This process is well known in the art of chroma key com positing. Each pixel of the background image (e.g. a monochromatic green background) is replaced by a corresponding pixel of the replacement background image.

Step 655 may also comprise at least one of the following: storing the processed images in the memory 420 of the computing device 400, displaying the processed images on the display 440 of the computing device 400, transmitting the processed images via the communication interface 430 of the computing device 400 (e.g. to a cloud storage server or to a plurality of devices for a live steaming session), etc.

A first adaptation of the implementation of the method 600A is as follows. The dynamic backdrop rear-illumination functionality is not applied to all the images received at step 615. For example, the functionality (steps 620 to 640) is applied only to a sample of the images received at step 615 (e.g. one image out of N received images). In another example, the functionality (steps 620 to 640) is applied only upon reception of a trigger (e.g. a trigger received from a user via the user interface 450 of the computing device 400 or a trigger received via the communication interface 430 of the computing device 400).

A second adaptation of the implementation of the method 600A is as follows. The light driver 221 is capable of controlling groups of light-emitting devices 211 independently of one another. For example, referring to FIG. 11, the light driver 221 is capable of controlling four groups of light-emitting devices 211 independently of one another (identified as group 1, group 2, group 3 and group 4 in FIG. 11). More specifically, the light driver 221 sets the operating parameters of all the light-emitting devices 211 belonging to a given group at the same value (e.g. the same light intensity and/or the same light color), which may differ from the operating parameters set for the other groups. Each group comprises one or more light-emitting devices 211 (a single independently controlled light-emitting device is considered as a group comprising one light-emitting device). The images received at step 615 are split into areas corresponding to the groups of light-emitting devices 211 (identified as area 1 corresponding to group 1, area 2 corresponding to group 2, area 3 corresponding to group 3 and area 4 corresponding to group 4 in FIG. 11). Steps 620, 625, 630 and 635 are applied to each area independently of one another. The light control commands generated at step 635 for a given area apply to the group of light-emitting devices 211 corresponding to the given area (e.g. the processing of area 3 of the images results in light control commands for group 3 of light-emitting devices 211). In addition to the previously mentioned light control data, each light control command also comprises an identifier of the group of light-emitting devices 211 to which the light control command(s) shall be applied (when the group comprises a single light-emitting device, the identifier identifies the individual light-emitting device). The identifier is converted by the processing unit 223B of the light remote control module 223 into information allowing the light driver 221 to target the proper group of light-emitting devices (or individual light-emitting device if applicable).

A third adaptation of the implementation of the method 600A is as follows. The method 600A comprises the additional step (not represented in FIG. 10A) of determining parameters associated to one or more front light source 50 illustrated in FIG. 2C. This additional step is executed by the processing 410 of the computing device 400. Examples of parameters associated to the front light source 50 include an intensity of the light emitted by the front light source 50, one or more position parameters of the front light source 50 (e.g. distance of the front light source 50 with respect to the subject 10, vertical elevation of the front light source 50, orientation of the front light source 50, a combination thereof, etc.), etc. The determination of a given parameter is performed as follows: the given parameter is configured in the memory 420 of the computing device 400, the given parameter is calculated by the processing unit 410 of the computing device 400 (e.g. based on information collected by an internal sensor of the computing device 400 (not represented in the Figures for simplification purposes), the given parameter is received via the communication interface 430 of the computing device 400 (e.g. from an external sensor not represented in the Figures for simplification purposes), etc. Steps 630 and 635 of the method 600A are adapted to also take into consideration the one or more parameter associated to the front light source 50 (in addition to the background image data) for the generation of the light control command(s). Alternatively, steps 630 and 635 of the method 600A are adapted to only take into consideration the one or more parameter associated to the front light source 50 for the generation of the light control command(s) (in this case, steps 620, 625 and 630 are not performed).

A fourth adaptation of the implementation of the method 600A is as follows. The method 600A comprises the additional step (not represented in FIG. 10A) of determining parameters associated to the subject 10 illustrated in FIGS. 2A and 2C. This additional step is executed by the processing 410 of the computing device 400. Examples of parameters associated to the subject 10 include a position of the subject 10, a movement of the subject 10, etc. The determination of a given parameter is performed as follows: the given parameter is configured in the memory 420 of the computing device 400, the given parameter is calculated by the processing unit 410 of the computing device 400 (e.g. based on information collected by an internal sensor of the computing device 400 (not represented in the Figures for simplification purposes), the given parameter is received via the communication interface 430 of the computing device 400 (e.g. from an external sensor not represented in the Figures for simplification purposes), etc. Steps 630 and 635 of the method 600A are adapted to also take into consideration the one or more parameter associated to the subject 10 (in addition to the background image data) for the generation of the light control command(s). Alternatively, steps 630 and 635 of the method 600A are adapted to only take into consideration the one or more parameter associated to the subject 10 for the generation of the light control command(s) (in this case, steps 620, 625 and 630 are not performed).

A person skilled in the art would readily understand that any combination of the background image data, the parameters associated to one or more front light source 50 and the parameters associated to the subject 10 may be determined and taken into consideration for the generation of the light control command(s).

A person skilled in the art would also readily understand that other types of parameters may be determined and taken into consideration (in addition or in place of the background image data) for the generation of the light control command(s).

Figure 10B:
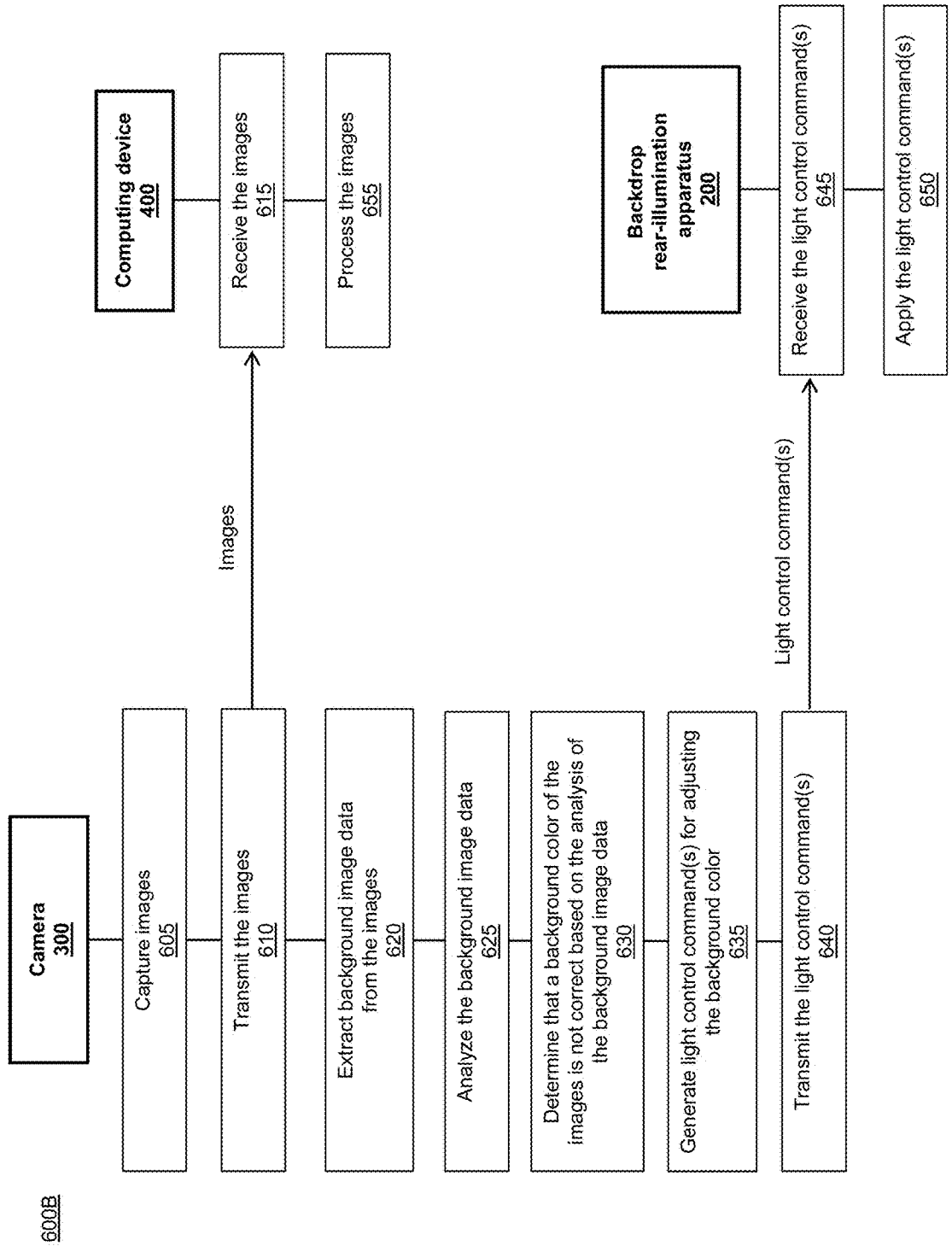

Referring now concurrently to FIGS. 2A, 2C, 5B, 5C, 6, 7, 10A, 10B and 11, a method 600B for performing algorithm based dynamic backdrop rear-illumination is illustrated in FIG. 10B. The method 600B is an adaptation of the method 600A represented in FIG. 10A, with some of the steps of the method 600A performed by the computing device 400 being now performed by the camera 300 in the method 600B.

More specifically, steps 620, 625, 630, 635 and 640 are performed by the camera 300 instead of the computing device 400. Steps 620 to 640 are executed by the processing unit 310 of the camera 300. The transmission at step 640 is performed via the communication interface 330 of the camera 300. The light control commands are received from the camera 300 at step 645.

All the details of the implementation of steps 620, 625, 630, 635 and 640, which have previously been described in relation to the method 600A, are applicable to the method 600B. For instance, the aforementioned adaptations of the implementation of the method 600A are also applicable to the method 600B.

Figure 10C:
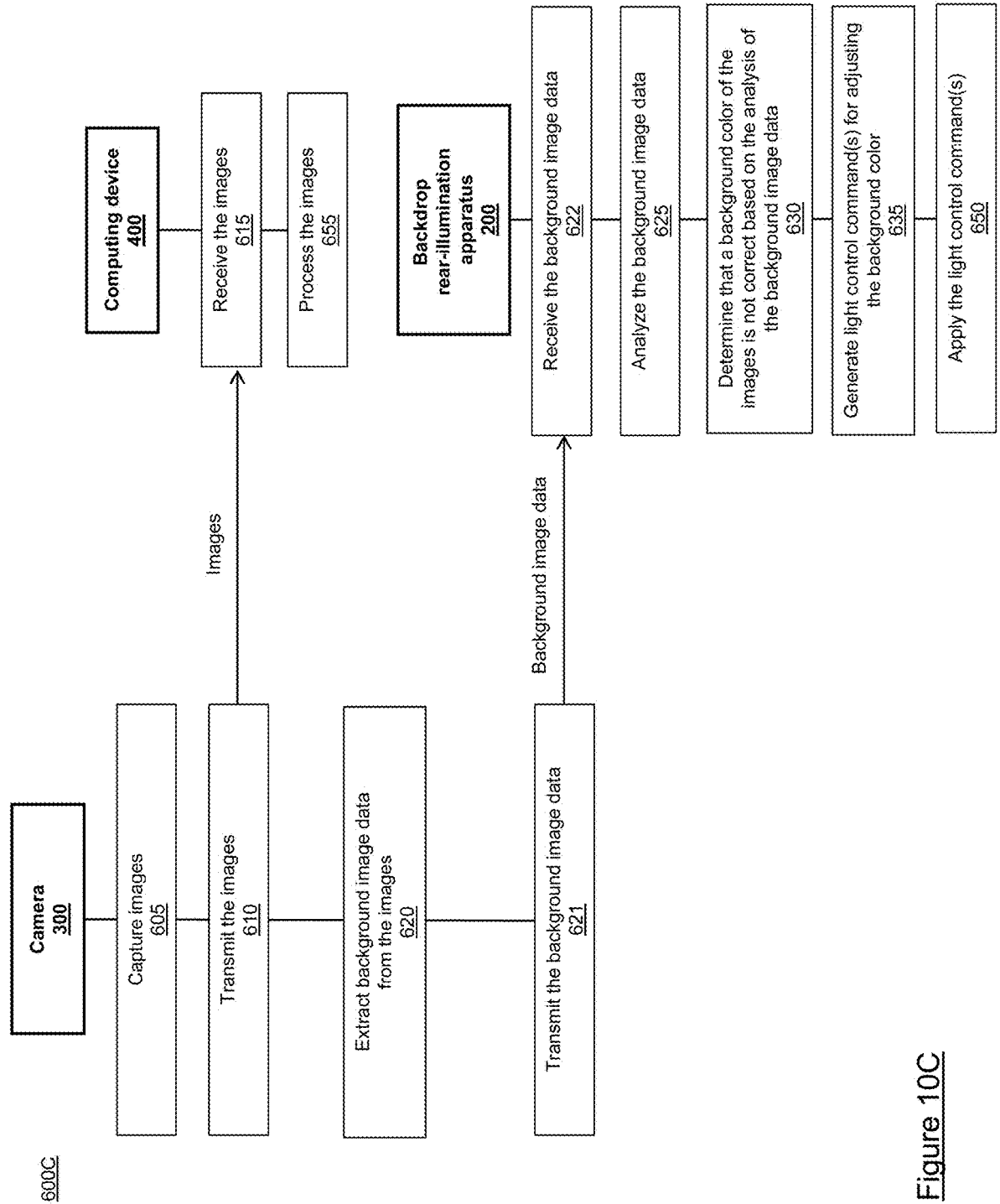

Referring now concurrently to FIGS. 2A, 2C, 5B, 5C, 6, 7, 10A, 10B, 10C and 11, a method 600C for performing algorithm based dynamic backdrop rear-illumination is illustrated in FIG. 10C. The method 600C is an adaptation of the method 600A represented in FIG. 10A, with some of the steps of the method 600A performed by the computing device 400 being now performed by the camera 300 and the backdrop rear-illumination apparatus 200 in the method 600C.

Step 620 is performed by the camera 300 instead of the computing device 400. Step 620 is executed by the processing unit 310 of the camera 300.

A new step 621 is performed by the camera 300. The method 600C comprises the step 621 of transmitting the background image data (extracted at step 620) to the backdrop rear-illumination apparatus 200. Step 621 is executed by the processing 310 of the camera 300. The transmission is performed via the communication interface 330 of the camera 300.

A new step 622 is performed by the backdrop rear-illumination apparatus 200. The method 600C comprises the step 622 of receiving the background image data (transmitted at step 621) at the backdrop rear-illumination apparatus 200. Step 622 is executed by the processing unit 223B of the light remote control module 223 of the backdrop rear-illumination apparatus 200. The reception is performed via the communication interface 223A of the light remote control module 223 of the backdrop rear-illumination apparatus 200.

Steps 625, 630 and 635 are performed by the backdrop rear-illumination apparatus 200 instead of the computing device 400. Steps 625 to 635 are executed by the processing unit 223B of the light remote control module 223 of the backdrop rear-illumination apparatus 200.

Steps 640 and 645 of the method 600A are not performed in the method 600C.

All the details of the implementation of steps 620, 625, 630 and 635, which have previously described in relation to the method 600A, are applicable to the method 600C. For instance, the aforementioned adaptations of the implementation of the method 600A are also applicable to the method 600C.

Algorithm Based Remote Control of the Front Light Source(s) and/or the Camera

Figure 12A:
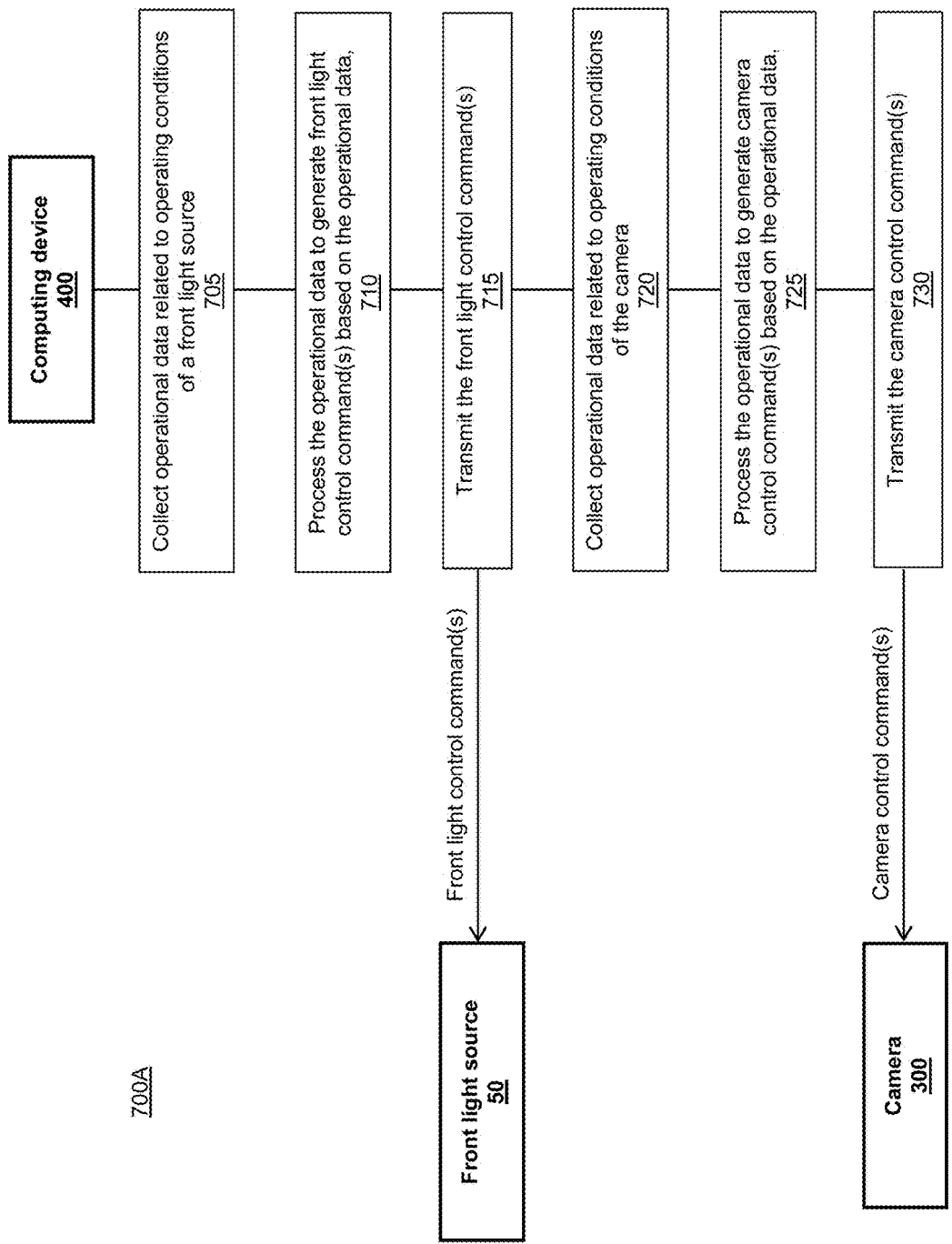
FIGS. 12A and 12B represent different implementations of a method for performing algorithm based remote control of the front light source(s) and camera represented in FIG. 2C.

Referring now concurrently to FIGS. 2A, 2C, 6 and 12A, a method 700A is illustrated in FIG. 12A for performing algorithm based remote control of the front light source(s) 50 (illustrated in FIG. 2C) and the camera 300 (illustrated in FIGS. 2A, 2C and 7). The method 700A is implemented by the computing device 400 (illustrated in FIGS. 2A and 6).

The method 700A comprises the step 705 of collecting operational data related to operating conditions of the front light source 50 illustrated in FIG. 2C. Step 705 is performed by the processing unit 410 of the computing device 400. The collection of operational data may be performed through transmission of relevant data by the front light source 50 to the computing device 400, transmission of relevant data by one or more sensor (not represented in the Figures) to the computing device 400, transmission of relevant data by the camera 300 to the computing device 400, etc.

The method 700A comprises the step 710 of processing the operational data (collected at step 705) to generate front light control command(s) based on the operational data. Step 710 is performed by the processing unit 410 of the computing device 400. The one or more front light control command controls operating parameter(s) (e.g. light intensity or light color) of the front light source 50.

The method 700A comprises the step 715 of transmitting the front light control command(s) (generated at step 710) to the front light source 50. Step 715 is executed by the processing 410 of the computing device 400. The transmission is performed via the communication interface 430 of the computing device 400. Although not represented in FIG. 12A for simplification purposes, upon reception by the front light source 50, the front light control commands are enforced by the front light source 50.

The method 700A comprises the step 720 of collecting operational data related to operating conditions of the camera 300 illustrated in FIGS. 2A, 2C and 7. Step 720 is performed by the processing unit 410 of the computing device 400. The collection of the operational data may be performed through transmission of relevant data by the camera 300 to the computing device 400, transmission of relevant data by one or more sensor (not represented in the Figures) to the computing device 400, transmission of relevant data by the front light source 50 to the computing device 400, etc.

The method 700A comprises the step 725 of processing the operational data (collected at step 720) to generate camera control command(s) based on the operational data. Step 725 is performed by the processing unit 410 of the computing device 400. The one or more camera control command comprises camera control data for controlling operating parameter(s) (e.g. exposure, gamma, more advanced settings such as specific color saturation or substitution, etc.) of the camera 300.

The method 700A comprises the step 730 of transmitting the camera control command(s) (generated at step 725) to the camera 300. Step 730 is executed by the processing 410 of the computing device 400. The transmission is performed via the communication interface 430 of the computing device 400. Although not represented in FIG. 12A for simplification purposes, upon reception by the camera 300, the front light control commands are enforced by the camera 300.

Steps 705 to 715 correspond to steps 510-515 and 540 of the method 500 illustrated in FIG. 9, with the usage of a remote control algorithm in place of a remote control GUI. Similarly, Steps 720 to 730 correspond to steps 510-515 and 545 of the method 500 illustrated in FIG. 9, with the usage of a remote control algorithm in place of a remote control GUI.

Optionally, only steps 705 to 715 or 720 to 730 are performed, to respectively control only the front light source 50 or only the camera 300. Furthermore, if several front light sources 50 are used (as illustrated in FIG. 2C with the key front light source 50 and the full front light source 50), steps 705 to 715 are repeated for each front light source 50.

Figure 12B:
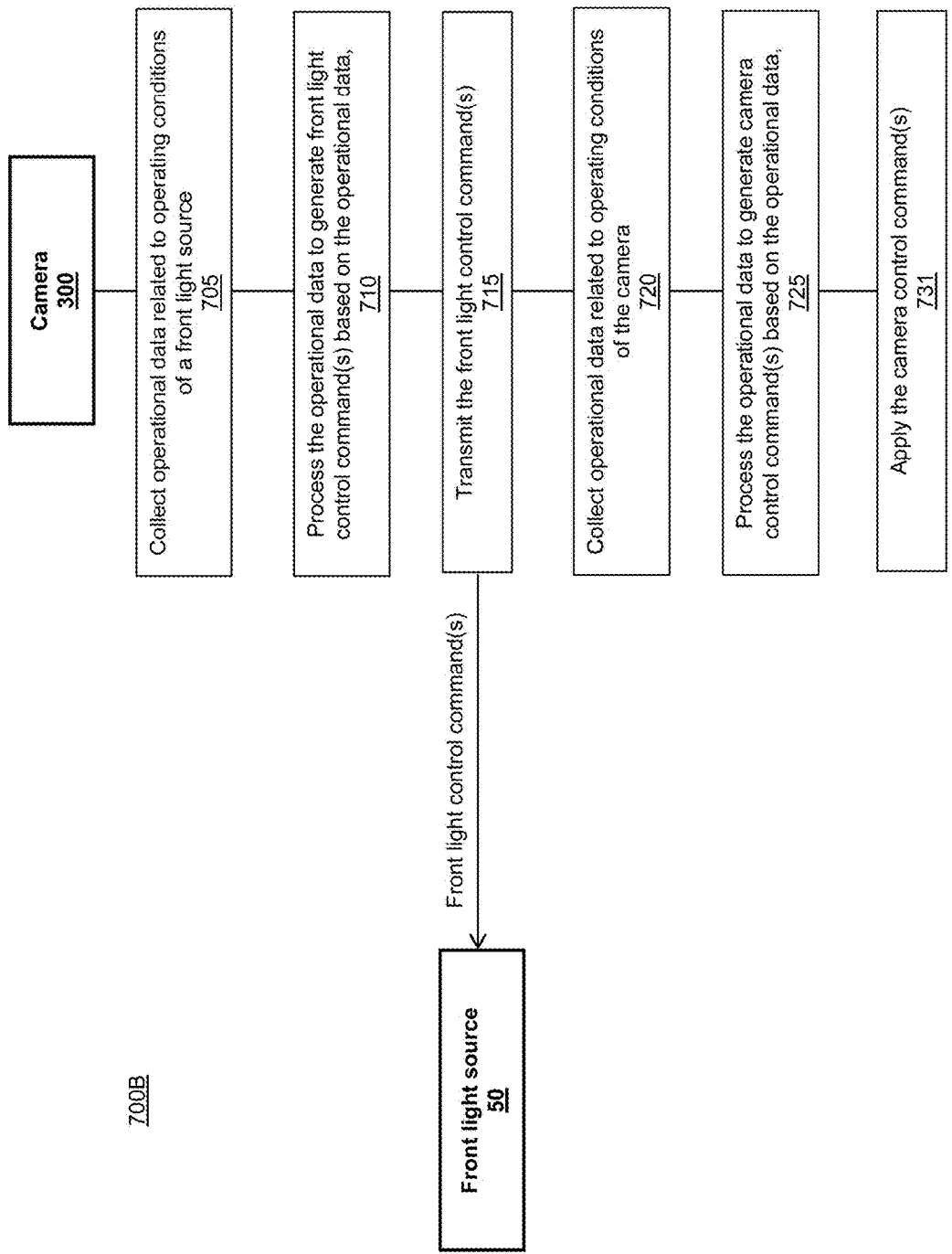

Referring now concurrently to—FIGS. 2A, 2C, 6, 12A and 12B, a method 700B is illustrated in FIG. 12B for performing algorithm based remote control of the front light source(s) 50 (illustrated in FIG. 2C) and the camera 300 (illustrated in FIGS. 2A, 2C and 7). The method 700B is an adaptation of the method 700A represented in FIG. 12A, with some of the steps of the method 700A performed by the computing device 400 being now performed by the camera 300 in the method 700B.

Steps 705 to 725 are performed by the camera 300 instead of the computing device 400. Steps 705 to 725 are executed by the processing unit 310 of the camera 300. The transmission at step 715 is performed via the communication interface 330 of the camera 300.

A new step 731 is performed instead of step 730. Step 731 is executed by the processing unit 310 of the camera 300. The method 700B comprises the step 731 of applying the camera control command(s) (generated at step 725) to the camera 300.

All the details of the implementation of steps 705 to 725, which have previously described in relation to the method 700A, are applicable to the method 700B.

An adaptation of the implementation of the method 700A is as follows. The method 700A comprises the additional step (not represented in FIG. 12A) of determining parameters associated to the subject 10 illustrated in FIGS. 2A and 2C. This additional step is executed by the processing 410 of the computing device 400. Examples of parameters associated to the subject 10 include a position of the subject 10, a movement of the subject 10, etc. The determination of a given parameter is performed as follows: the given parameter is configured in the memory 420 of the computing device 400, the given parameter is calculated by the processing unit 410 of the computing device 400 (e.g. based on information collected by an internal sensor of the computing device 400 (not represented in the Figures for simplification purposes), the given parameter is received via the communication interface 430 of the computing device 400 (e.g. from an external sensor not represented in the Figures for simplification purposes), etc. Step 710 of the method 700A is adapted to also take into consideration the one or more parameter associated to the subject 10 (in addition to the operational data related to operating conditions of the front light source 50) for the generation of the front light control command(s). Alternatively or complementarily, step 725 of the method 700A is adapted to also take into consideration the one or more parameter associated to the subject 10 (in addition to the operational data related to operating conditions of the camera 300) for the generation of the camera control command(s). Alternatively, steps 710 and/or 725 of the method 700A are adapted to only take into consideration the one or more parameter associated to the subject 10 for the generation of the front light control command(s) and/or camera control commands (in this case, steps 705 and/or 720 are not performed). The implementation of the method 700B illustrated in FIG. 12B may be adapted in a similar manner to take into consideration one or more parameter associated to the subject 10.

A person skilled in the art would readily understand that the method 700A represented in FIG. 12A may also be adapted for being performed by the backdrop rear-illumination apparatus 200 instead of the computing device 400. In this case, steps 705 to 730 are executed by the processing unit 223B of the light remote control module 223 of the backdrop rear-illumination apparatus 200 illustrated in FIGS. 5B and 5C.

Furthermore, the methods for adjusting the operating parameters of the backdrop rear-illumination apparatus 200 (methods 600A or 600B respectively illustrated in FIGS. 10A and 10B) may be combined with the methods for adjusting the operating parameters of the front light source(s) 50 and camera 300 (methods 700A or 700B respectively illustrated in FIGS. 12A and 12B). For instance, a single algorithm may be used to simultaneously adjust the operating parameters of the backdrop rear-illumination apparatus 200 and the front light source(s) 50. Alternatively, a single algorithm may be used to simultaneously adjust the operating parameters of the backdrop rear-illumination apparatus 200 and the camera 300. Alternatively, a single algorithm may be used to simultaneously adjust the operating parameters of the backdrop rear-illumination apparatus 200, the front light source(s) 50 and the camera 300.

Additionally, a combination of the previously described GUIs and algorithms may be used for adjusting the operating parameters of the backdrop rear-illumination apparatus 200, the front light source(s) 50 and the camera 300. For example, steps 510-515, 540-545 of the method 500 represented in FIG. 9 (usage of a GUI) may be used in combination with the steps of the method 600A represented in FIG. 10A (usage of an algorithm).

Usage of a Neural Network

Figure 13:
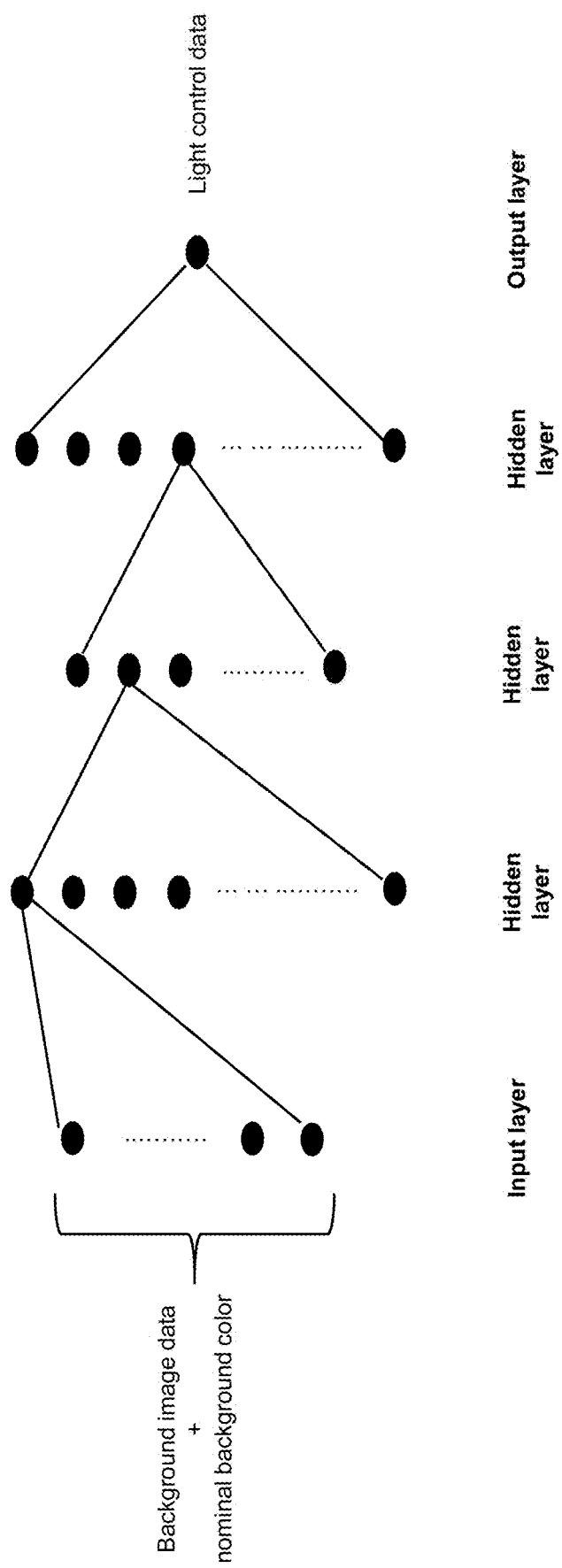
FIG. 13 represents a neural network used for implementing steps of the methods illustrated in FIGS. 10A, 10B and 10C.

Reference is now made concurrently to FIGS. 10A, 10B, 10C and 13, where FIG. 13 represents a neural network used for implementing some of the steps of the methods 600A, 600B and 600C respectively illustrated in FIGS. 10A, 10B and 10C. More specifically, the neural network is used for the implementation of steps 625, 630 and 635.

Neural networks are well known in the art. Following is a brief description of how a neural network operates. The neural network comprises an input layer, followed by one or more intermediate hidden layer, followed by an output layer, where the hidden layers are fully connected. The input layer comprises neuron(s) for receiving input data. The output layer comprises neuron(s) for outputting output data. The generation of the output data based on the input data uses weights allocated to the neurons of the neural network. A layer L being fully connected means that each neuron of layer L receives inputs from every neurons of layer L-1 and applies respective weights to the received inputs. By default, the output layer is fully connected to the last hidden layer.

The weights associated to the neurons of the neural network, as well as other parameters (e.g. number of layers, number of neurons per layers, etc.), are referred to as a predictive model. The predictive model is generated during a training phase, where training data (sets of input data and corresponding output data) are used for training the neural network. The result of the training phase is the predictive model. The predictive model (the weights, etc.) is used during an operational phase for inferring output data when the neural network is presented with a given set of input data.

In the context of the previously described methods 600A, 600B and 600C, the input data used for the input layer of the neural network comprise the background image data and the nominal background color. As mentioned previously, only a sample of the background image data can be used to limit the number of inputs of the neural network. The output data generated by the output layer of the neural network comprise the light control data (applicable to the backdrop rear-illumination apparatus 200 illustrated in FIGS. 2A, 2C, 5B and 5C). The input data used for the input layer of the neural network may be adapted, for example by taking into consideration additional data, by replacing the background image data and/or the nominal background color by other data, etc.

During the training phase, experimental background image data, corresponding nominal background colors and corresponding light control data are collected and used to train the neural network and generate the predictive model.

Although not represented in FIG. 13, the neural network may further include one or more convolutional layer, optionally followed by respective one or more pooling layer, followed by a flattening layer (before the hidden layers). The usage of convolutional layer(s) is adapted to neural networks where the input data are in the form of (multidimensional) arrays of data, which is presently the case when the background image data consist of a 3D array of pixel intensity values having M columns and N rows, and a third dimension of size 3 for the RGB color components. Furthermore, several 3D arrays of pixel intensity values corresponding to consecutive images captured at step 605 may be used simultaneously as input data for the neural network.

A neural network may also be used for implementing step 710 of the methods 700A and 700B respectively illustrated in FIGS. 12A and 12B. The outputs of the neural network comprise front light control data (for controlling operating parameters of the front light source 50 illustrated in FIG. 2C). Similarly, a neural network may be used for implementing step 725 of the methods 700A and 700B respectively illustrated in FIGS. 12A and 12B. The outputs of the neural network comprise camera control data (for controlling operating parameters of the camera 300 illustrated in FIGS. 2A, 2C and 7).

A single neural network may also be used for generating outputs comprising any combination of the aforementioned light control data (applicable to the backdrop rear-illumination apparatus 200 illustrated in FIGS. 2A, 2C, 5B and 5C), front light control data (applicable to the font light source 50 illustrated in FIG. 2C) and camera control data (applicable to the camera 300 illustrated in FIGS. 2A, 2C and 7).

The terminology subject has been used throughout the disclosure with reference to the subject 10 represented in FIGS. 2A-C. The terminology subject should be interpreted broadly as including one or more human being, one or more animal, one or more object, a combination thereof, etc.

Reference has been made to memory throughout the disclosure. The terminology memory should be interpreted broadly as including any device which allows for the reading, writing and storing of data (e.g. software instructions, commands, system generated variables, user generated variables, etc.). In particular, a memory may be a standalone electronic component or integrated to an electronic component (e.g. memory integrated to a System on Chip (SOC) such as, but not limited to, an FPGA).

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A backdrop rear-illumination apparatus comprising:
   a light assembly comprising one or more light-emitting device, a light emitted by each light-emitting device first passing through several consecutive layers of diffusing material and then passing through a green screen, the diffusing material being partially translucent and diffusing light, the layers of diffusing material having complementary diffusing properties; and
   a light controller comprising:
      at least one light driver for controlling at least one operating parameter of the one or more light-emitting device; and
      at least one user interface or a light remote control module for respectively actuating the at least one light driver.

2. The backdrop rear-illumination apparatus of claim 1, wherein each light-emitting device emits one of the following: a monochromatic light, a white light or a broad spectrum light having Red, Green and Blue (RGB) components.

3. The backdrop rear-illumination apparatus of claim 1, wherein the at least one operating parameter of the one or more light-emitting device comprises at least one of the following: an intensity of the light emitted by each light-emitting device and a color of the light emitted by each light-emitting device.

4. The backdrop rear-illumination apparatus of claim 1, wherein the light remote control module comprises a communication interface for receiving light control commands from a remote computing device; the light remote control module further comprising a processing unit for processing the light control commands to generate control signals for actuating the at least one light driver to control the at least one operating parameter of the one or more light-emitting device.

5. The backdrop rear-illumination apparatus of claim 4, wherein the light assembly comprises a plurality of light-emitting devices and each light control command comprises light control data for controlling one or more of the at least one operating parameter of one of the following: all the light-emitting devices of the plurality of light-emitting devices, a group of light-emitting devices selected from the plurality of light-emitting devices or a single light-emitting device of the plurality of light-emitting devices.

6. The backdrop rear-illumination apparatus of claim 1, wherein the layers of diffusing material have at least one of the following properties: the layers of diffusing material are made of different complementary materials and the layers of diffusing material have different colors.

7. The backdrop rear-illumination apparatus of claim 1, wherein the layers of diffusing material are close to the green screen, the layers of diffusing material are close to the light assembly, or some of the layers of diffusing material are close to the green screen and some of the layers of diffusing material are close to the light assembly.

8. An active green screen comprising:
a green screen;
several consecutive layers of diffusing material, the diffusing material being partially translucent and diffusing light, the layers of diffusing material having complementary diffusing properties; and
a backdrop rear-illumination apparatus, the backdrop rear-illumination apparatus comprising:
a light assembly comprising one or more light-emitting device, a light emitted by each light-emitting device first passing through the consecutive layers of diffusing material and then passing through the green screen; and
a light controller comprising:
at least one light driver for controlling at least one operating parameter of the one or more light-emitting device; and
at least one user interface or a light remote control module for respectively actuating the at least one light driver.

9. The active green screen of claim 8, wherein the green screen is made of a fabric.

10. The active green screen of claim 8, wherein the one or more light-emitting device comprises at least one of the following: an incandescent lamp or a device using a light emitting diode (LED).

11. The active green screen of claim 8, wherein each light-emitting device emits one of the following: a monochromatic light, a white light or a broad spectrum light having Red, Green and Blue (RGB) components.

12. The active green screen of claim 8, wherein the at least one operating parameter of the one or more light-emitting device comprises at least one of the following: an intensity of the light emitted by each light-emitting device and a color of the light emitted by each light-emitting device.

13. The active green screen of claim 8, wherein the light remote control module comprises a communication interface for receiving light control commands from a remote computing device; the light remote control module further comprising a processing unit for processing the light control commands to generate control signals for actuating the at least one light driver to control the at least one operating parameter of the one or more light-emitting device.

14. The active green screen of claim 13, wherein the light assembly comprises a plurality of light-emitting devices and each light control command comprises light control data for controlling one or more of the at least one operating parameter of one of the following: all the light-emitting devices of the plurality of light-emitting devices, a group of light-emitting devices selected from the plurality of light-emitting devices or a single light-emitting device of the plurality of light-emitting devices.

15. A method for performing dynamic backdrop rear-illumination, the method comprising:

extracting by the processing unit of the computing device background image data from images captured by a camera;

processing by an algorithm executed by the processing unit of the computing device the background image data, the algorithm outputting at least one metric representative of a compliance of a background color of the images with a nominal background color;

determining that the background color of the images is not compliant with the nominal background color based on the at least one metric;

generating one or more light control command comprising light control data, the light control data being generated based at least on the at least one metric;

transmitting the one or more light control command to a backdrop rear-illumination apparatus via a communication interface of the computing device;

receiving the one or more light control command at the backdrop rear-illumination apparatus via a communication interface of the backdrop rear-illumination apparatus; and processing by a processing unit of the backdrop rear-illumination apparatus the light control data of the one or more light control command to generate control signals for controlling at least one operating parameter of at least one light-emitting device of the backdrop rear-illumination apparatus.

16. The method of claim 15, wherein the at least one light-emitting device of the backdrop rear-illumination apparatus emits a light that first passes through a diffusing material and then passes through a green screen to generate a uniform color background for a subject positioned in front of the green screen.

17. The method of claim 16, wherein the diffusing material comprises several consecutive layers of diffusing material, the diffusing material being partially translucent and diffusing light; and the green screen is made of a fabric.

18. The method of claim 15, wherein the at least one operating parameter of the at least one light-emitting device of the backdrop rear-illumination apparatus comprises at least one of the following: an intensity of a light emitted by each light-emitting device and a color of a light emitted by each light-emitting device.

19. The method of claim 15, wherein the backdrop rear-illumination apparatus comprises a plurality of light-emitting devices and the processing of the light control data of each light control command generates the controls signals for controlling the at least one operating parameter of one of the following: all the light-emitting devices of the plurality of light-emitting devices, a group of light-emitting devices selected from the plurality of light-emitting devices or a single light-emitting device of the plurality of light-emitting devices.

20. The method of claim 15, wherein the at least metric output by the algorithm comprises a Mean Square Error (MSE) calculated based on the background image data and the nominal background color, the generation of the light control data of the one or more light control command being based at least one the MSE.

* * * * *